(12) United States Patent
Taniguchi et al.

(10) Patent No.: US 8,122,579 B2
(45) Date of Patent: Feb. 28, 2012

(54) CELL PRODUCTION METHOD AND CELL PRODUCTION FACILITY

(75) Inventors: Takao Taniguchi, Toyota (JP);
Shigeharu Ikeda, Kariya (JP);
Kuniyuki Hashimoto, Nisio (JP); Junji Sugawara, Nagoya (JP)

(73) Assignee: Aisin AW Co. Ltd., Aichi (JP)

( * ) Notice: Subject to any disclaimer, the term of this patent is extended or adjusted under 35 U.S.C. 154(b) by 1097 days.

(21) Appl. No.: 11/791,455

(22) PCT Filed: Dec. 22, 2005

(86) PCT No.: PCT/JP2005/023678
§ 371 (c)(1),
(2), (4) Date: Dec. 26, 2007

(87) PCT Pub. No.: WO2006/068252
PCT Pub. Date: Jun. 29, 2006

(65) Prior Publication Data
US 2008/0104818 A1    May 8, 2008

(30) Foreign Application Priority Data
Dec. 24, 2004  (JP) .................... 2004-374179

(51) Int. Cl.
*B21D 39/00* (2006.01)
*B23P 21/00* (2006.01)

(52) U.S. Cl. ............... 29/429; 29/430; 29/783; 29/784; 29/791; 29/794; 29/822; 29/823; 29/824

(58) Field of Classification Search ............... 29/897.2, 29/429, 430, 469, 783, 784, 791, 794, 822, 29/823, 824, 281.1, 281.4, 281.5
See application file for complete search history.

(56) References Cited

U.S. PATENT DOCUMENTS
6,226,848 B1    5/2001   Kurtz

FOREIGN PATENT DOCUMENTS
| DE | 40 20 286 A1 | 1/1992 |
| EP | 0 718 179 A1 | 6/1996 |
| GB | 2 361 904 A | 11/2001 |
| JP | 59-15626 U | 1/1984 |

(Continued)

OTHER PUBLICATIONS

Extended European Search Report (EESR) for corresponding EP Patent Application No. 05 81 9767 dated Apr. 4, 2011.

*Primary Examiner* — Jermie Cozart
(74) *Attorney, Agent, or Firm* — Sughrue Mion, PLLC

(57) ABSTRACT

A cell manufacturing method in which a main operator, who carries out main operations that include a plurality of steps in which parts are installed on a workpiece, is moved along with the workpiece so as to transit a plurality of stations where auxiliary steps related to the main operations are carried out. At least a portion of operations in which parts and/or jigs are supplied to a main car are carried out via a main delivery apparatus by using a main car on which a workpiece is mounted and on which a main operator rides, and that travels automatically on a predetermined travel route that transits a plurality of stations. The main delivery apparatus has a main serving position and a main receiving position. Parts and/or jigs that have been disposed at the main receiving position are delivered to the main serving position.

28 Claims, 21 Drawing Sheets

FOREIGN PATENT DOCUMENTS

| | | |
|---|---|---|
| JP | 2-83816 U | 6/1990 |
| JP | 2-279479 A | 11/1990 |
| JP | 5-104341 A | 4/1993 |
| JP | 8-47818 A | 2/1996 |
| JP | 2000-281209 A | 10/2000 |
| JP | 2003-251575 A | 9/2003 |
| JP | 2004-230485 A | 8/2004 |
| JP | 2005-182388 A | 7/2005 |

FIG. 4

OPERATION STEPS OVERVIEW LIST

| MAIN OPERATION | | SUBSIDIARY OPERATION | |
|---|---|---|---|
| SYMBOL | NAME | SYMBOL | NAME |
| ML1 | B2 PISTON AND SNAP RING ASSEMBLED | SL1 | B2 ASSEMBLY ASSEMBLED |
| ML2 | REAR SUB-ASSEMBLY ASSEMBLED | SL2 | REAR SUB-ASSEMBLY ASSEMBLED |
| ML3 | B2 BRAKE PLATE THICKNESS MEASURED AND B2 BACKING PLATE SELECTED | | |
| ML4 | B2 BACKING PLATE AND SNAP RING ASSEMBLED | SL4 | SNAP RING PREPARED |
| ML5 | F1 ONE-WAY CLUTCH AND SNAP RING ASSEMBLED | SL5 | ONE-WAY CLUTCH AND SNAP RING PREPARED |
| ML6 | CENTER SUPPORT AND COUNTER GEAR ASSEMBLY ASSEMBLED | SL6 | COUNTER GEAR ASSEMBLY ASSEMBLED |
| ML7 | COUNTER GEAR INCLINATION MEASURED | | |
| ML8 | DRIVE PINION ASSEMBLY ASSEMBLED FOR THE DIFF | SL8 | 1) DRIVE PINION ASSEMBLY ASSEMBLED 2) DIFF ASSEMBLY ASSEMBLED |
| ML9 | FRONT ASSEMBLY DRIVE SUN GEAR AND B-1 BAND BRAKE ASSEMBLED | SL9 | FRONT SUB-ASSEMBLY ASSEMBLED |
| ML10 | OIL PUMP ASSEMBLY BOLT TIGHTENED | SL10 | OIL PUMP ASSEMBLY ASSEMBLED |
| ML11 | END PLAY MEASURED | | |
| ML12 | B1 BAND BRAKE STROKE MEASURED | | |
| ML13 | B1 PISTON ASSEMBLY ASSEMBLED | | |

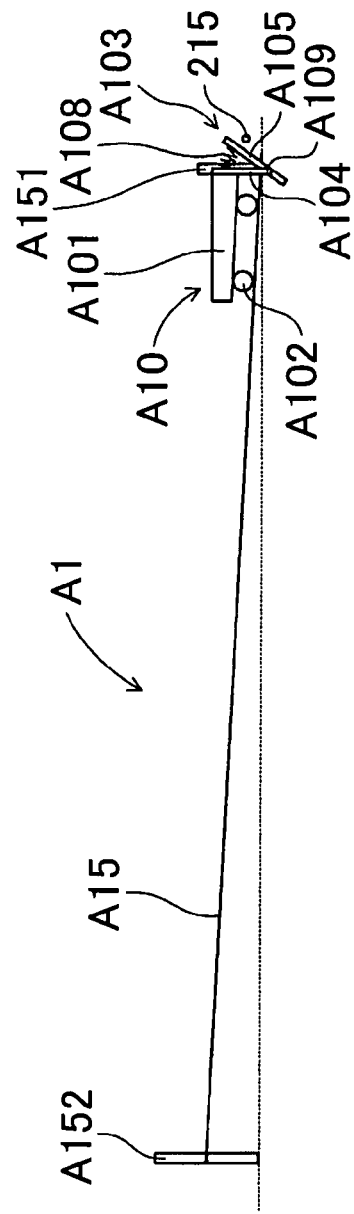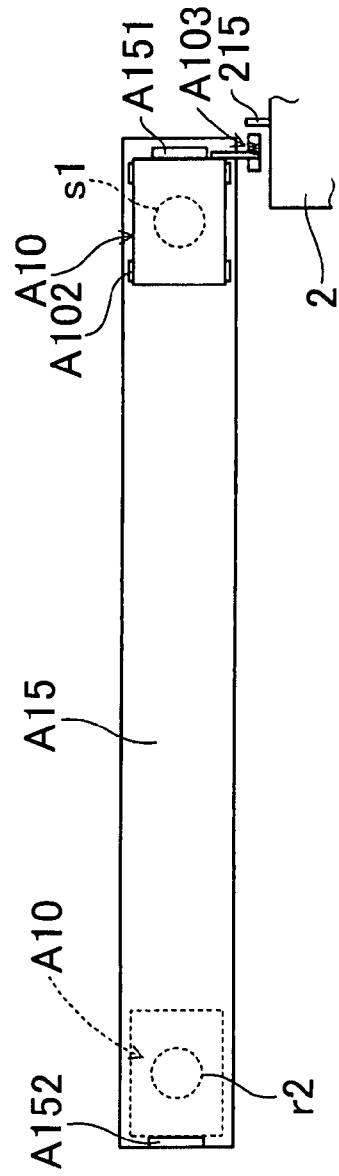
F I G. 17A
F I G. 17B

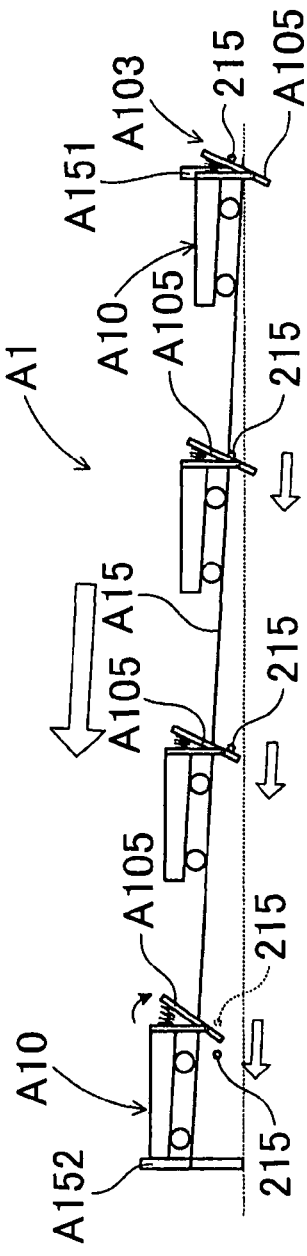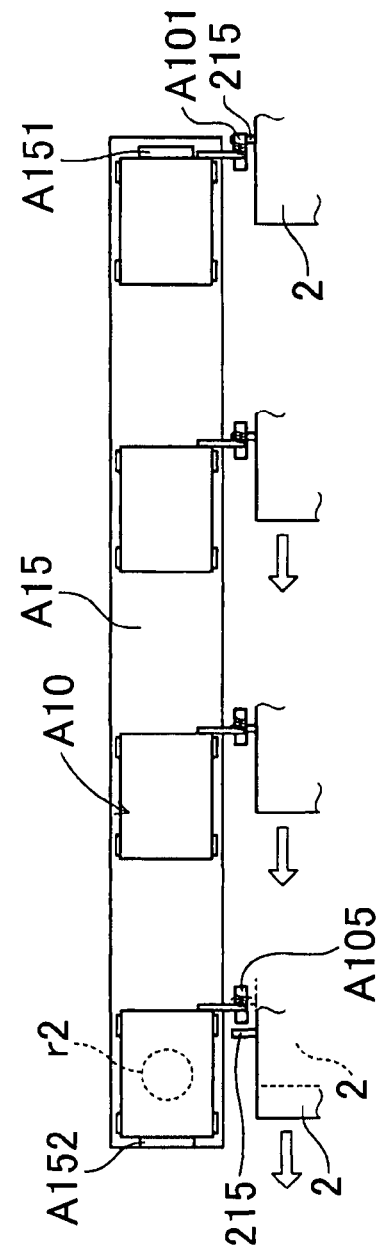
FIG. 18A
FIG. 18B

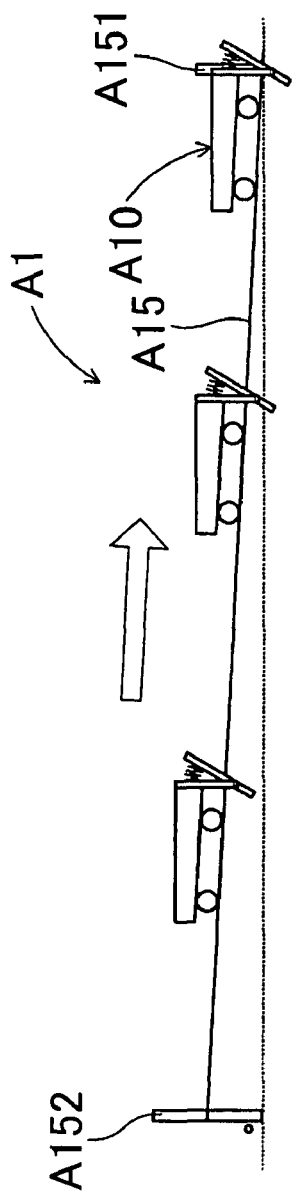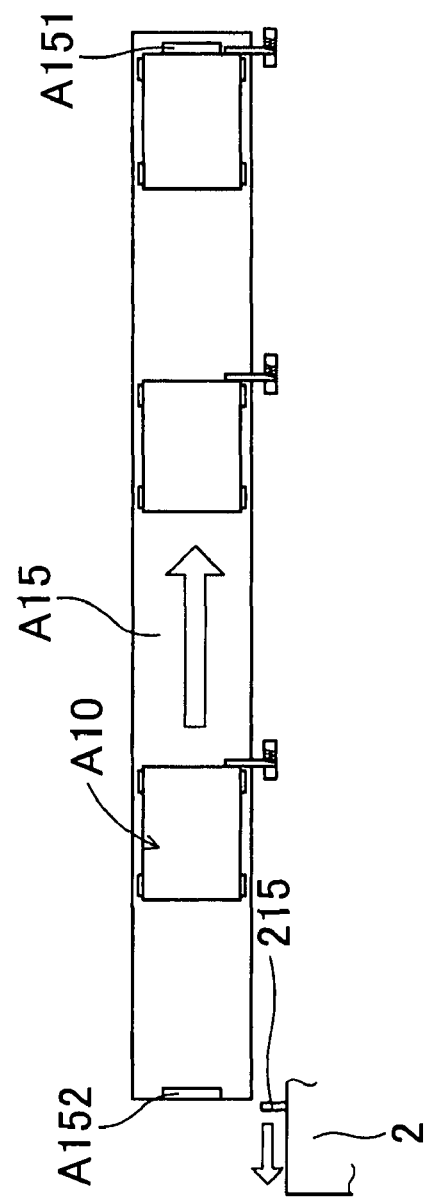
FIG. 19A
FIG. 19B

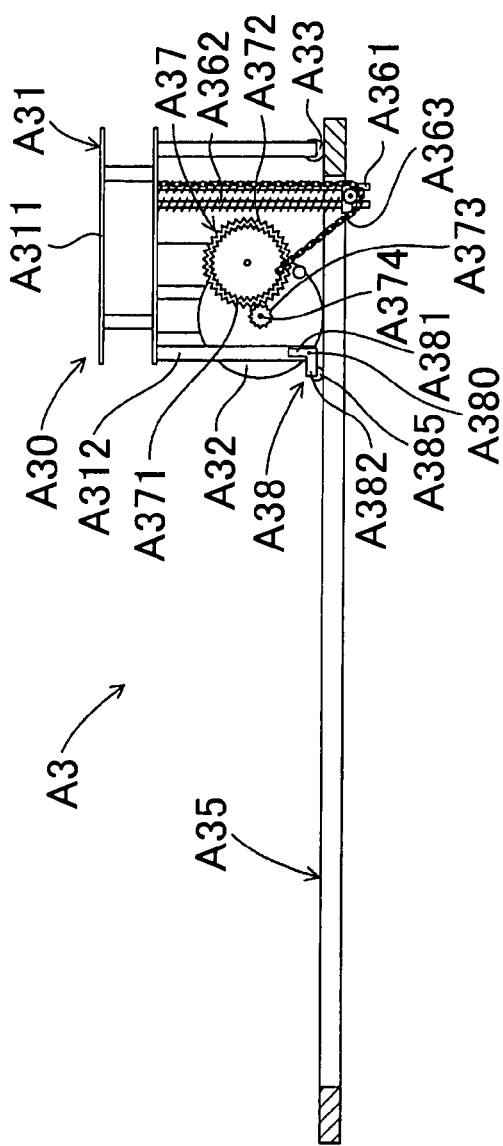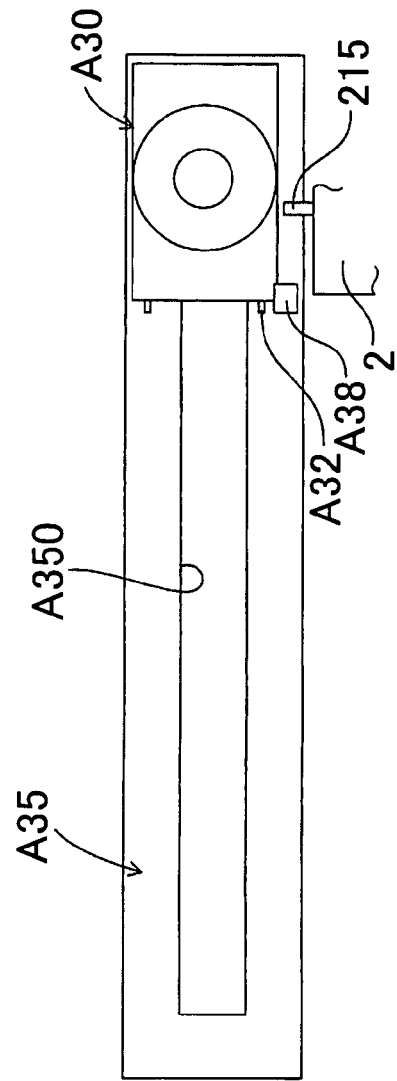
FIG. 21A
FIG. 21B

CELL PRODUCTION METHOD AND CELL PRODUCTION FACILITY

TECHNICAL FIELD

Exemplary embodiments of the present invention relate to a cell manufacturing method in which substantially one operator carries out a plurality of operation steps on one workpiece, and relates to a cell manufacturing facility.

BACKGROUND ART

One method of manufacturing products is what is termed a line production method, which uses a conveyor belt. In this line production method, a plurality of stations is provided along a conveyor line, and at each station, there is an operator positioned with manufacturing equipment, tools, parts, materials and the like. In addition, workpieces are conveyed in sequence by a conveyor belt, prescribed operating steps are carried out at the respective stations, and the product is thereby manufactured. While this line production method is suitable for mass production, a large capital expenditure is necessary, and when the product specifications are changed, this method cannot readily and flexibly respond.

In recent years, in order to respond to the diversification of consumer needs and the like in the field of automobile production and electrical equipment production, the need to manufacture many models in small lots has been increasing. In place of the line production method, a cell manufacturing method, in which one operator carries out a plurality of operation steps, is gradually coming into use as a production method that is suitable for this small-scale production of many models. In the cell manufacturing method, there are the advantages that the response to product specification changes is facilitated and capital expenditures can be reduced. In addition, from the point of view of the operator, the method will be embraced willingly because there is an awareness that the product has been completed by himself.

Japanese Patent Application Publication No. JP-A-2003-251575, for example, discloses an example of a cell manufacturing method in which a workpiece is mounted on a hand-pushed operating car, and operations are carried out while the car transits the plurality of stations. In addition, a means to raise and lower the workpiece is provided, and improvements in productivity and a reduction in the operator fatigue can be realized.

However, in the cell manufacturing method of Patent Document 1, while the operating car is in motion, the operation steps do not proceed, and it cannot be said that the productivity is sufficient. Thus, a significant increase in efficiency and a reduction in production lead time can be expected. Furthermore, there are cases in which parts that are pre-assembled by combining component parts are necessary, and the problems of eliminating storage space and the labor for managing these parts remain. In addition, when one operator carries out all operation steps, including the operations for the sub-assembly, the number of stations becomes too large, the movement distance is drastically increased, and the content of the operation is complex. Thus, there are cases in which this cannot be adopted as a suitable production method.

In consideration of these circumstances, aspects of the present invention provides a cell manufacturing method and a cell manufacturing facility that significantly increases the productivity beyond that of the related art, can reduce production lead time, minimizes the amount of parts requiring storage, and distributes the operation steps among a plurality of operators.

SUMMARY OF THE INVENTION

An aspect of the present invention is to provide a cell manufacturing method, in which a main operator who carries out main operations that include a plurality of steps in which parts are attached to a workpiece, is moved with the workpiece so as to transit a plurality of stations in which auxiliary steps related to the main operations are carried out by providing a main car on which the workpiece is mounted and on which the main operator rides, and which travels automatically on a predetermined travel route that transits the plurality of stations. A main delivery apparatus is also provided that is a type of station in which, among a main serving position at which parts and/or jigs that are necessary for the main operations are transferred to the main car and a main receiving position at which parts and/or jigs are received from the main car, parts and/or jigs that have been disposed at the main receiving position are delivered to the main serving position; then at least a portion of the operations in which parts and/or jigs are supplied to the main car is carried out by the main delivery apparatus.

It will be appreciated that in the present specification, for convenience, a facility that has a function in which auxiliary steps related to the main operations are carried out is called a "station". Examples of a "station" include a station in which an auxiliary step wherein a workpiece is loaded on an operation car, a station at which an auxiliary step is carried out in which a workpiece is unloaded from an operation car, a station at which an auxiliary step is carried out in which parts to be attached to the workpiece are supplied, a station at which an auxiliary step is carried out in which tools (jigs) that are used in an operation are supplied, a station at which an auxiliary step is carried out in which predetermined processing is carried out after the workpiece has been received from an operation car, and the like. Note that the main delivery apparatus described above and the subsidiary delivery apparatus described below can be referred to as stations.

The main delivery apparatus, as explained above, is an apparatus that delivers parts and/or jigs that are mounted at the main receiving position to the main serving position. Thus, by using this main delivery apparatus, the main car that is continually moving can always receive parts and/or jigs that are necessary for the main operations at the main serving position, which is a fixed position, subsequently the main operations are carried out while moving, and the main car can return the parts and/or jigs at the main receiving position, which is a destination, after the operation has been completed. Thus, a cell manufacturing method can be realized more smoothly.

In addition, in a cell manufacturing method according to an exemplary embodiment, a subsidiary car is used on which a subsidiary operator rides, the operator carrying out subsidiary operations in which parts and/or jigs that are necessary for the main operations are prepared, and the main car and the subsidiary car travel together so as to be able to transfer the parts and/or jigs between the main car and the subsidiary car. Accordingly, a more efficient cell manufacturing method can be implemented.

In addition, the transfer of the parts and/or jigs between the main car and the subsidiary car can be carried out while the main car and the subsidiary car travel together extremely closely so as to allow direct transfer between a main operator on a main car and a subsidiary operator on a subsidiary car. In addition, it is possible for the main car and the subsidiary car to travel together such that what may be termed indirect transfer can be carried out via a separately provided transfer apparatus, which is a kind of station, rather than the direct transfer of the parts and/or jigs between the main operator and the subsidiary operator.

Note that the subsidiary operations may include operations in which parts are assembled by component parts being combined and pre-assembled. In addition, the subsidiary operations may include operations in which a part is set in a jig and operations in which the component parts are set in a jig.

In addition, by introducing a subsidiary car in this manner, it is possible to proceed by dividing the operation steps into main steps and subsidiary steps and carrying out the steps at the same time.

In the case in which the subsidiary car is introduced, at least two operators may be used: one who carries out main operations on a main car and one who carries out subsidiary operations on a subsidiary car.

In the main operations, the principal operation steps that bring the assembly of the product to completion are carried out. Note that the concept of a "product" in the present application is not limited to the finished product that is used by what is referred to as an end user, but includes all individual items that are assembled by a plurality of sequences of operations, such as products that are parts to be incorporated into these finished products.

In addition, the main operations are not simply general assembly operations in which parts are incorporated, but may also include inspection operations in which, for example, the dimensions of the finished product are confirmed or the operational status is confirmed. A portion of the tools that are used in the main operations are provided in the main car, and the remainder can be provided at each station. In addition, among the members and parts that are used in the main operations, those necessary for preparatory operations can be received from a subsidiary car, and the others can be supplied from each of the stations. Small parts such as screws may be provided in the main car.

In subsidiary operations, the preparation of parts and/or jigs that are necessary for the main operations is carried out. In the subsidiary operations, composite parts (referred to as "assemblies" in the embodiments) may be assembled by combining and pre-assembling component parts. In addition, the parts or component parts can be set in a jig and then transferred to the main operations. The tools, members, and parts that are used in the subsidiary operations can be prepared in advance at each of the stations or on the subsidiary cars.

In the case in which the subsidiary car is introduced, the main operations and the subsidiary operations described above can proceed by being carried out at the same time on two cars that travel together. Thereby, because the operation steps have been divided and carried out, it is possible to reduce the manufacturing lead time. In addition, because the parts that have been assembled in the subsidiary operations are used immediately in the main operations, the need to temporarily store these parts is eliminated.

In addition, in the case in which the subsidiary car is introduced, furthermore, by using a subsidiary delivery apparatus that is a type of station in which, between a subsidiary serving position at which parts and/or jigs that are necessary for the subsidiary operations are transferred to the subsidiary car and a subsidiary receiving position at which parts and/or jigs are received from the subsidiary car, parts and/or jigs that have been disposed at a subsidiary receiving position are delivered to a subsidiary serving position; then at least a portion of the operations in which parts and/or jigs are supplied to the subsidiary car can be carried out by the subsidiary delivery apparatus.

This subsidiary delivery apparatus is an apparatus that, as explained above, delivers parts and/or jigs that have been mounted at a subsidiary receiving position to a subsidiary serving position. Thus, by using this subsidiary delivery apparatus, a subsidiary car that is continually moving can always receive parts and/or jigs that are necessary for subsidiary operations at a subsidiary serving position, which is a fixed position, subsequently the subsidiary operation is carried out while moving, and the subsidiary car can return the parts and/or jigs at the subsidiary receiving position, which is a destination, after the operation has been completed. Thus, a cell manufacturing method can be realized more smoothly.

In the case in which the subsidiary car is introduced, there is also a cell manufacturing method in which only a subsidiary delivery apparatus is provided, and the main delivery apparatus is not provided.

Specifically, a cell manufacturing method in which a main operator, who carries out main operations that include a plurality of steps in which parts are installed on a workpiece, is moved with the workpiece so as to transit a plurality of stations at which auxiliary operations related to the main operations are carried out, is characterized in that by using:

a main car on which a workpiece is mounted and a main operator rides, and that travels automatically on a predetermined travel route that transits the plurality of stations;

a subsidiary car on which a subsidiary operator rides, the subsidiary operator carrying out subsidiary operations in which parts and/or jigs that are necessary for the main operations are prepared; and a subsidiary delivery apparatus that is a type of station in which, among a subsidiary serving position at which parts and/or jigs that are necessary for the subsidiary operations are transferred to the subsidiary car and a subsidiary receiving position at which parts and/or jigs are received from the subsidiary car, parts and/or jigs that have been disposed at the subsidiary receiving position are delivered to the subsidiary serving position;

then at least a portion of the operations in which parts and/or jigs are supplied to the subsidiary car can be carried out via the subsidiary delivery apparatus, and the main car and the subsidiary car travel together so as to be able to transfer the parts and/or jigs between the main car and the subsidiary car.

In order to actually carry out the cell manufacturing method of the present invention, it is possible to use the cell manufacturing method of the present invention that will be explained below.

Specifically, a cell manufacturing method, in which a main operator, who carries out main operations that include a plurality of steps in which parts are installed on a workpiece, is moved with the workpiece so as to transit a plurality of stations at which auxiliary operations related to the main operations are carried out, is characterized in including:

a main car that is provided with a workpiece holding portion that holds the workpiece and a riding portion on which a main operator can ride so as to be able to carry out operations on the workpiece that is held in the workpiece holding portion, and that is provided with a travel control apparatus that controls the travel state, and that automatically travels on a predetermined travel path that transits the plurality of stations; and a main delivery apparatus that is a type of station in which, among a main serving position at which parts and/or jigs that are necessary for the main operations are transferred to the main car and a main receiving position at which parts and/or jigs are received from the main car, the parts and/or jigs that have bee disposed at the main receiving position are delivered to the main serving position;

wherein at least a portion of the operations in which parts and/or jigs are supplied to the main car can be carried out by the main delivery apparatus.

As explained above, the main delivery apparatus is an apparatus in which, as has been described, parts and/or jigs that have been disposed on a main receiving position are delivered to a main serving position. Thus, by using this main delivery apparatus, a main car that is continually moving always receives parts and/or jigs that are necessary for the main operations at the main serving position, which is a fixed position, subsequently carries out the main operations while moving, and can return the parts and/or jigs at the main receiving position, which is the destination, after the operation has been completed. Thus, a cell manufacturing method can be realized more smoothly.

Furthermore, there may be a subsidiary car on which a subsidiary operator rides, the subsidiary operator carrying out subsidiary operations in which parts and/or jigs that are necessary for the main operations are prepared, wherein the main car and the subsidiary car travel together so as to be able to transfer parts and/or jigs between the main car and the subsidiary car.

In the exemplary case, as described above, by introducing a subsidiary car, the operation steps can be divided into main steps and subsidiary steps and these can proceed by carrying out the steps at the same time, and the cell manufacturing method can be implemented more efficiently.

In addition, in the case in which a subsidiary car is introduced, there may be a subsidiary delivery apparatus that is a kind of station in which, among a subsidiary serving position at which parts and/or jigs that are necessary for the subsidiary operations are transferred to a subsidiary car and a subsidiary receiving position at which the parts and/or jigs are received from a subsidiary car, the parts and/or jigs that have been disposed at the subsidiary receiving position are delivered to the subsidiary serving position, and at least a portion of the operations in which parts and/or jigs are supplied to the subsidiary car can be carried out via the subsidiary delivery apparatus.

In the exemplary case, as described above, by using the subsidiary delivery apparatus, a subsidiary car that is continuously moving always receives the parts and/or jigs that are necessary for subsidiary operations at the subsidiary serving position, which is a fixed position, the subsidiary operations can be carried out while moving, and it is possible to return the parts and/or jigs at the subsidiary receiving position, which is the destination, after the operation has been completed. Thus, the operation in the subsidiary car in the cell manufacturing method can be carried out more smoothly.

In addition, in the case in which a subsidiary car is introduced, there is also a cell manufacturing method in which only with a subsidiary delivery apparatus is provided, and a main delivery apparatus is not provided.

Specifically, a cell manufacturing method, in which a main operator, who carries out main operations that include a plurality of steps in which parts are installed on a workpiece, is moved with the workpiece so as to transit a plurality of stations in which auxiliary steps related to the main operations are carried out, is characterized in including:

a main car that is provided with a workpiece holding portion that holds the workpiece and a riding portion on which a main operator rides so as to be able to carry out operations on the workpiece that is held in the workpiece holding portion, and is provided with a travel control apparatus that controls the travel state, and that automatically travels on a predetermined travel path that transits the plurality of stations;

a subsidiary car on which a subsidiary operator rides, the subsidiary operator carrying out subsidiary operations in which parts and/or jigs that are necessary for the main operations are prepared; and a subsidiary delivery apparatus that is a type of station in which, among a subsidiary serving position at which parts and/or jigs that are necessary for a subsidiary operations are transferred to the subsidiary car and a subsidiary receiving position at the parts and/or jigs are received from the subsidiary car, parts and/or jigs that have been disposed on the subsidiary receiving position are delivered to the subsidiary serving position; wherein at least a portion of the operations in which parts and/or jigs are supplied to the subsidiary car can be carried out via the subsidiary delivery apparatus, and the main car and the subsidiary car travel together so as to be able to transfer parts and/or jigs between the main car and the subsidiary car.

The main delivery apparatus includes a main mounting platform that can move between the main serving position and the main receiving position, and the main mounting platform is structured so as to be disposed to be able to move along an inclined path that inclines such that the height increases as the main receiving position is approached from the main serving position, the main mounting platform is linked to and moves in synchrony with the main car from the main serving position to the main receiving position, and the main mounting platform moves along the inclined path under its own weight and returns to the main serving position by releasing the link with the main car at the main receiving position, and stands by.

In this exemplary case, the forward motion of the main mounting platform can be carried out by the travel force of the main car to which it is linked, whereas the return of the main mounting platform can be realized under the weight of the main mounting platform due to the presence of the inclined path. That is, it is possible to move the main mounting platform without introducing a dedicated drive force. Thus, it is possible to realize reduced facility introduction expenses and running costs.

In addition, the main delivery apparatus includes a main mounting platform that can move between the main serving position and the main receiving position, and the main mounting platform is structured so as to include energy storing means that stores energy accompanying the movement from the main serving position to the main receiving position and kinetic energy converting means that converts the energy that has been stored by the energy storing means into kinetic energy that acts on the main mounting platform from the main receiving position to the main serving position, the main mounting platform is linked to and moves in synchrony with the main car from the main serving position to the main receiving position, the energy storing means stores energy, and by releasing link with the main car at the main receiving position, the main mounting platform returns to the main serving position due to kinetic energy, which is the energy stored by the energy storing means that has been converted into kinetic energy by the kinetic energy converting means, and stands by.

In this case as well, the forward movement of the main mounting platform can be carried out by the travel force of the main car that is linked thereto, whereas the return of the main mounting platform can be realized by the energy storing means and the kinetic energy converting means. That is, in this exemplary case as well, it is possible to move the main mounting platform without introducing a dedicated drive force. Thus, it is possible to reduce the facility introduction costs and the running costs.

In addition, the main delivery apparatus may include a main mounting platform that can move between the main serving position and the main receiving position, and the main mounting platform is structured so as to be moved from the main receiving position to the main serving position under the weight of the parts and/or jigs that have been disposed on the main mounting platform, and includes energy storing means that stores energy and kinetic energy converting means that converts the energy that has been stored by the energy storing means into kinetic energy that acts on the main mounting platform from the main serving position to the main receiving position, the main mounting platform moves from the main receiving position to the main serving position due to the parts and/or jigs being disposed on the main mounting platform at the main receiving position, the energy is stored in the energy storing means, and stands by, and by the parts and/or jigs being removed from the main mounting platform at the main serving position, the main mounting platform returns to the main receiving position due to the kinetic energy, which is the energy stored by the energy storing means that has been converted into kinetic energy by the energy converting means, and stands by.

In this case, although the forward movement of the main mounting platform is not in synchrony with the travel of the main car, due to the energy storing means and the kinetic energy converting means, it is possible to realize the movement of the main mounting platform under the weight of the parts and/or jigs. That is, in this exemplary case as well, it is possible to move the main mounting platform without introducing a dedicated drive force. Thus, it is possible to realize a reduction in the facility introduction cost and the running costs.

In addition, the main delivery apparatus may be structured so as to have a main rail that is inclined such that the height increases as the main receiving position is approached from the main serving position, and by engaging the parts and/or jigs with the rail at the main receiving position, the parts and/or jigs move along the main rail under their own weight, and they return to the main serving position to stand by.

In this exemplary case, due to the presence of the main rail, the parts and/or jigs can be moved under their own weight, and the parts and/or jigs can be moved without introducing a dedicated drive force. Thus, it is possible to realize a reduction in the facility introduction costs and the running costs.

The subsidiary delivery apparatus includes a subsidiary mounting platform that can move between the subsidiary serving position and the subsidiary receiving position, and the subsidiary mounting platform is structured so as to be disposed to be able to move along an inclined path that inclines such that the height increases as the subsidiary receiving position is approached from the subsidiary serving position, the subsidiary mounting platform is linked to and moves in synchrony with the subsidiary car from the subsidiary serving position to the subsidiary receiving position, and by releasing the link with the subsidiary car at the subsidiary receiving position, the subsidiary mounting platform returns to the subsidiary serving position by moving along the inclined path under its own weight, and stands by.

In this exemplary case as well, the forward movement of the subsidiary mounting platform can be carried out by the travel force of the subsidiary car that is linked thereto, whereas the return of the subsidiary mounting platform can be realized under the weight of the subsidiary mounting platform due to the presence of the inclined path. That is, it is possible to move the subsidiary mounting platform without introducing a dedicated drive force. Thus, it is possible to reduce the facility introduction cost and the running costs.

In addition, the subsidiary delivery apparatus may include a subsidiary mounting platform that can move between the subsidiary serving position and the subsidiary receiving position, and this subsidiary mounting platform is structured so as to include energy storing means that stores energy accompanying the movement from the subsidiary serving position to the subsidiary receiving position and kinetic energy converting means that converts the energy that has been stored by the energy storing means into kinetic energy that acts on the subsidiary mounting platform from the subsidiary receiving position to the subsidiary serving position, the subsidiary mounting platform is linked to and moves in synchrony with the subsidiary car from the subsidiary serving position to the subsidiary receiving position, energy is stored by the energy storing means, and by releasing the link with the subsidiary car at the subsidiary receiving position, the subsidiary mounting platform returns to the subsidiary serving position due to the kinetic energy, which is the energy stored by the energy storing means that has been converted into kinetic energy by the kinetic energy converting means, and stands by.

In this exemplary case as well, the forward movement of the subsidiary mounting platform can be carried out by the travel force of the subsidiary car to which it is linked, whereas the return of the subsidiary mounting platform can be realized by the energy storing means and the kinetic energy converting means. That is, in this case as well, the subsidiary mounting platform can be moved without introducing a dedicated drive force. Thus, it is possible to realize a reduction in the facility introduction cost and the running costs.

In addition, the subsidiary delivery apparatus includes a subsidiary mounting platform that can move between the subsidiary serving position and the subsidiary receiving position, and the subsidiary mounting platform is structured so as to include energy storing means that stores energy accompanying the movement from the subsidiary receiving position to the subsidiary serving position under the weight of the parts and/or jigs that have been disposed on the subsidiary mounting platform and kinetic energy converting means that converts the energy that has been stored by the energy storing means into kinetic energy that acts on the mounting platform from the subsidiary serving position to the subsidiary receiving position, the subsidiary mounting platform moves from the subsidiary receiving position to the subsidiary serving position due to parts and/or jigs being mounted on the subsidiary mounting platform, which is at the subsidiary receiving position, energy is stored by the energy storing means, and stands by, and by removing the parts and/or jigs from the subsidiary mounting platform at the subsidiary serving position, the subsidiary mounting platform returns to the subsidiary receiving position due to the kinetic energy, which is energy stored in the energy storing means that has been converted into kinetic energy by the kinetic energy converting means, and stands by.

In this exemplary case, although the forward movement of the subsidiary mounting platform is not in synchrony with the travel of the subsidiary car, due to the energy storing means and the kinetic energy converting means, it is possible to realize the movement of the subsidiary mounting platform under the weight of the parts and/or jigs. That is, in this case as well, it is possible to move the subsidiary mounting platform without introducing a dedicated drive force. Thus, it is possible to realize a reduction in the facility introduction cost and the running costs.

In addition, the subsidiary delivery apparatus may be structured so as to include a subsidiary rail that is inclined such that the height increases as the subsidiary receiving position is approached from the subsidiary serving position, and by engaging the parts and/or jigs with the subsidiary rail at the subsidiary receiving position, the parts and/or jigs return to the subsidiary serving position by moving along the subsidiary rail under their own weight, and stand by.

In this exemplary case, it is possible to move the parts and/or jigs under their own weight due to the presence of the subsidiary rail, and it is possible to move the parts and/or jigs without introducing a dedicated drive force. Thus, it is possible to realize a reduction in the facility introduction cost and the running costs.

In addition, the main car may be provided with a workpiece holding portion that holds the workpiece and a riding portion on which an operator can ride so as to be able to carry out operations while traveling.

In addition, the main car is may be provided with a travel control apparatus that controls the travel route, which transits the plurality of stations, and the travel speed. An automated guided vehicle, which is commonly referred to as an AGV, can be adopted as the main car that is provided with the travel control apparatus.

According to this mode, the main car can automatically travel along a predetermined travel route while the main operator is riding thereon. Therefore, it is not necessary for the main operator to drive the main car, it is possible for the main operator to concentrate on the operation even while traveling, and the operation performance is increased. Note that a drive operating portion may be provided in order for the main operator to drive while riding thereon. Thereby, the main operator can switch between the automatic travel and manual travel as necessary to carry out intended travel.

A plurality of main cars may also be able to travel simultaneously along the travel route. For example, if a plurality of automated guided vehicles is used and control is carried out such that the automated guided vehicles travel so as to maintain a space therebetween, a production amount can be expected that is equivalent to the production amount per automated guided vehicle multiplied by the number of vehicles.

In the case in which a subsidiary car is introduced, the subsidiary car is provided with a riding portion on which the operator can ride so as to be able to carry out operations while traveling. According to this mode, even while the subsidiary car is traveling similarly to the main car, the subsidiary operator can concentrate on the operation, and the efficiency of the operation is increased.

The subsidiary car may be provided with tracking means in order to travel together with the main car. The tracking means may be a linking rod that links the subsidiary car and the main car. In addition, the tracking means may include a wireless communication means that operates between the subsidiary car and the main car and a subsidiary travel control apparatus that controls the travel of the subsidiary car. The subsidiary car may travel together with the main car so as not to become separated therefrom, so that it is possible to directly or indirectly transfer parts and/or jigs to the main car.

A connecting rod that physically connects the subsidiary car and the main car may be used as the tracking means for traveling together. Because the subsidiary car can also travel due to the drive force of the main car because of the connecting rod, a power source for the subsidiary car becomes unnecessary. However, a condition of this mode is that no obstacles are present where the connecting rod passes along the travel route.

In cases in which, for example, the part shelves of a station interfere with the passage of a connecting rod, wireless communication means and a subsidiary car control apparatus may be provided. In the wireless communication means, information about the position and speed of the cars can be transmitted between the subsidiary car and the main car. In addition, in the subsidiary travel control apparatus, it is possible to carry out control of the travel of the subsidiary car in conformity to the position and speed of the main car. Note that in a method using wireless communication means, a power source is also necessary for the subsidiary car.

The same number of subsidiary cars as the plurality of main cars can travel together associated with the respective main cars. In order to increase the production amount, the subsidiary cars that are associated with the plurality of main cars are used in the same number as the main cars and travel together.

The main car may have a circular route on which it returns to the original position after circling one time, and the subsidiary car may have a circular subsidiary route that is on the outside of this circular route. At the point in time that the main car has transited all stations and the workpiece has been completed, the workpiece is exported from the main car. Subsequently, in order to manufacture the next workpiece, it is necessary for the main car to return to the original start position. Therefore, having a circular route in which the workpiece export position is associated with the start position is advantageous in terms of production efficiency. In the case in which this route is made a linear one-way return travel route, time is lost when the main car returns along the return route without any operation being carried out.

When the main car has a circular route, the subsidiary car travels together along the outside or the inside of the circular route of the main car. Here, the case in which the subsidiary operations handle a larger number of parts than the main operations is common. Therefore, an arrangement in which the main car is disposed on the inside and the subsidiary car is disposed on the outside, and furthermore, the parts are supplied from the outside, is rational.

The travel route of the main car is segmented into a plurality of segments, and separate subsidiary cars that travel together on the respective segmented travel routes may be provided. In the case in which the subsidiary car has a larger number of operations than the main car, separate subsidiary cars may be provided such that the subsidiary operations are carried out by a plurality of operators. Thereby, it is possible to distribute the subsidiary operations to the plurality of operators rationally, and the overall production efficiency is significantly improved.

For example, in the case in which there are twice as many subsidiary operations as there are main operations, the travel route may be segmented into a front half and a back half, and one main car may travel together with two subsidiary cars, where one subsidiary car is on the front half and the other subsidiary car is on the back half. According to this mode, the subsidiary car that travels together along the front half of the travel route can continue the subsidiary operations independently while the main car is traveling along the back half of the route. In addition, it is possible to finish the subsidiary operations exactly by the time that the main car has returned, and to deliver the parts and/or jigs. A subsidiary car that travels together along the back half of the travel route is similar.

The subsidiary car may have a subsidiary travel route along which it travels together with the main car and may have a subsidiary return route along which it returns to the original position after separating from the main car. In addition, the subsidiary car may have a subsidiary travel route along which it travels together with the main car and may return to the original position by traveling backward along the subsidiary travel route after separating from the main car.

In the case in which the travel route of the main car described above is segmented and the main car travels together with separate subsidiary cars, after the subsidiary car has traveled together along the subsidiary travel route, the subsidiary car separates from the main car and returns to the original position by traveling on an independent route. Here, a subsidiary return route may be provided that is separate from the subsidiary travel route, or the subsidiary car may travel backward along the subsidiary travel route. Whether to use either of the routes may be determined by taking into account the disposition of the content of the subsidiary operations and the parts and jigs, restrictions on the operation area, and the like.

BRIEF DESCRIPTION OF THE DRAWINGS

Aspects of the present invention will become more apparent by describing in detail non-limiting embodiments thereof with reference to the attached drawings, in which:

FIG. 4 is a figure of a transmission production step list that shows the operation steps according to an exemplary embodiment.

FIG. 17 is (a) a side view that shows the main delivery apparatus and (b) a planar view that shows the main delivery apparatus according to an exemplary embodiment.

FIG. 18 is (a) a side view that shows the state in which the main mounting platform is moving forward and (b) a planar view that shows the state in which the main mounting platform is moving forward according to an exemplary embodiment.

FIG. 19 is (a) a side view that shows the state in which the main mounting platform is moving backward and (b) a planar drawing that shows the state in which the main mounting platform is moving backward according to an exemplary embodiment.

FIG. 21 is (a) a side view that shows the structure of an energy storing-type main delivery apparatus and (b) a planar view that shows the structure of the energy storing-type main delivery apparatus according to an exemplary embodiment.

DETAILED DESCRIPTION OF EXEMPLARY EMBODIMENTS OF THE INVENTION

The following description of illustrative, non-limiting embodiments of the invention discloses specific configurations and components. However, the embodiments are merely examples of the present invention and, thus, the specific features described below are merely used to more easily describe such embodiments and to provide an overall under-standing of the present invention. Accordingly, one skilled in the art will readily recognize that the present invention is not limited to the specific embodiments described below. Furthermore, the descriptions of various con-figurations, components, processes and operations of the embodiments that are known to one skilled in the art are omitted for the sake of clarity and brevity.

Exemplary embodiments of the invention will be explained in detail with reference to FIG. 1 to FIG. 15. The perspective view of FIG. 1 is an explanatory drawing that shows a facility that is an exemplary embodiment of the cell manufacturing facility of the present invention and in which an automatic transmission is manufactured, and the overall structure will be explained with reference to the drawings.

Figure 1:
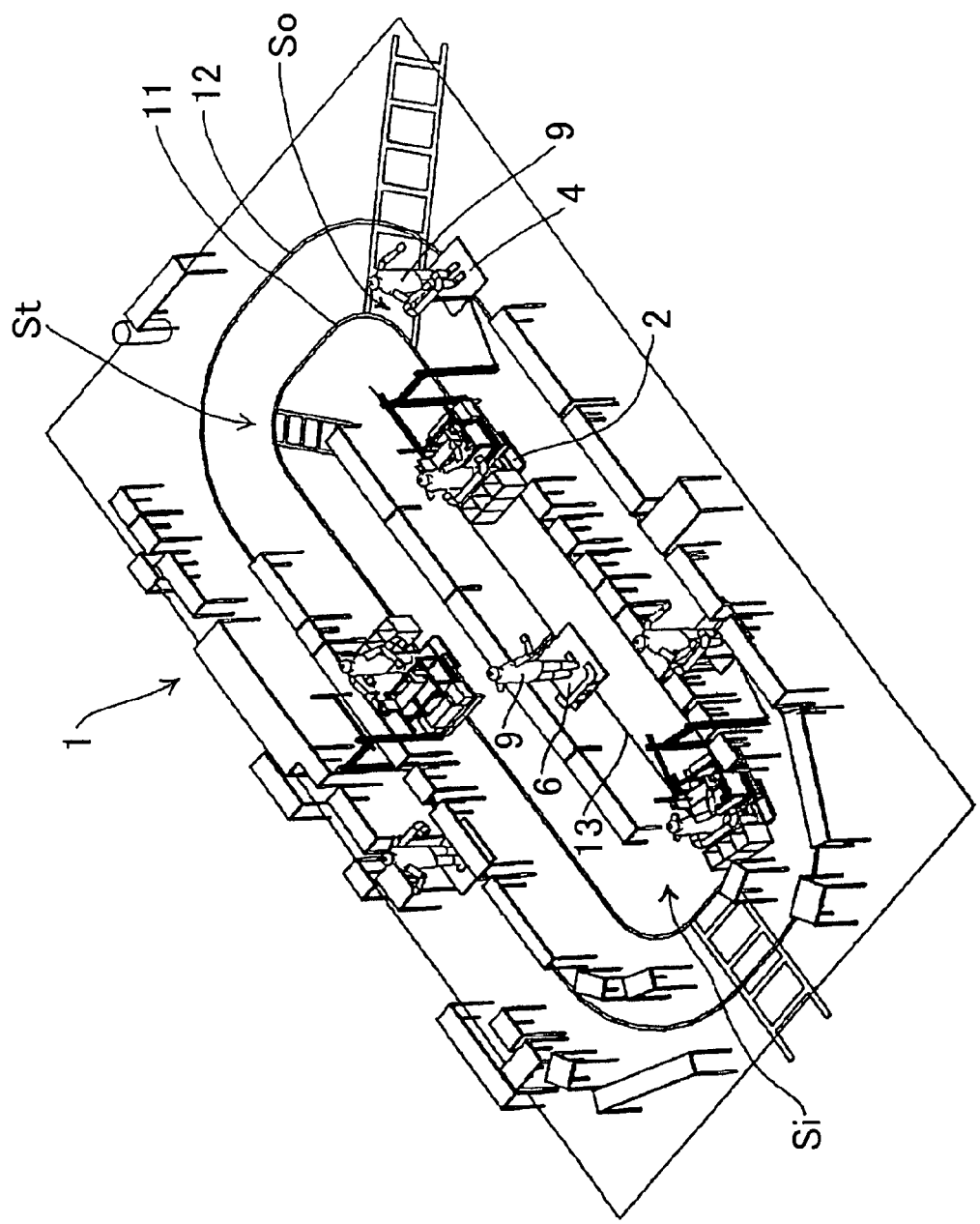
FIG. 1 is a perspective view for explaining a transmission production facility, which is an exemplary embodiment of the cell manufacturing facility of the present invention.

In the transmission production facility in FIG. 1, three groups, each group consisting of a main car 2 and a subsidiary car 4, travel together. Each of the main cars 2 automatically travels along an inner circular route 11. The subsidiary cars 4 are linked to and pushed by the main cars 2, and travel on an outside circular route 12. In addition, a linear route 13 is provided from the lower left to the upper right in FIG. 1, and the preprocessing car 6 travels reciprocally thereon. The operators 9 ride each of the cars 2, 4, and 6, and are able to carry out operations while traveling. In addition, stations are provided along each of the routes 11, 12, 13, and structured such that the necessary parts and/or jigs are prepared.

What is here referred to as a "station", as has been described above, is a facility having the function in which auxiliary steps related to the main operations are carried out. For example, not only do the import station Si, the switching station St, and the export station So described below correspond to stations, but, for example, there are also stations at which auxiliary steps are carried out. For example, there are stations where parts to be attached to the workpiece are supplied, stations at which the tools (jigs) used in an operation are supplied, and stations at which predetermined processes are carried out after receiving a workpiece from the operation cars. More specifically, there are stations in the facility at which the operation steps of the main operations represented by the reference symbols ML1 to ML13 (FIG. 3) described below are carried out, and stations at which the operation steps of the subsidiary operations represented by the reference symbols SL1 to SL10 (FIG. 3) described below are carried out. Furthermore, the transfer apparatus described below is also a type of station.

As will be appreciate, rather than using the subsidiary car 4 that travels together with the main car 2, it is possible to use a subsidiary car or the like that travels together with a stationary station or a mobile station, or travels only in a predetermined segment, or does not travel with the main car 2 from beginning to end. However, in the present example, an example that includes a subsidiary car is used.

The case 7 of a transmission may serve as a workpiece of the transmission production facility 1. The case 7 is mounted on a preprocessing car 6 at the import station Si on the lower left of FIG. 1, and it is conveyed to the switching station St in the upper right of the figure. At the switching station St, the case 7 is switched from the preprocessing car 6 to the main car 2. While the main car 2 travels around the circular route 11 to the left, parts are installed in the case 7 to complete the transmission, and the main car 2 arrives at the export station So. At the export station So, after the completed transmission has been exported, the main car 2 returns to the switching station St, and the next case is mounted thereon.

A subsidiary car 4 is pushed by a main car 2 and travels along the outer circular route 12. The subsidiary car 4 is positioned, for example, to the right in front of a main car 2, and they travel together. In addition, parts and materials are taken from outside of the circular route 12, and after the preparatory operations such as pre-assembly have been carried out, the parts and jigs are mounted on a mounting platform that is inside of the circular route 12. Thereby, the transfer to the following main car 2 can be carried out.

Figure 2:
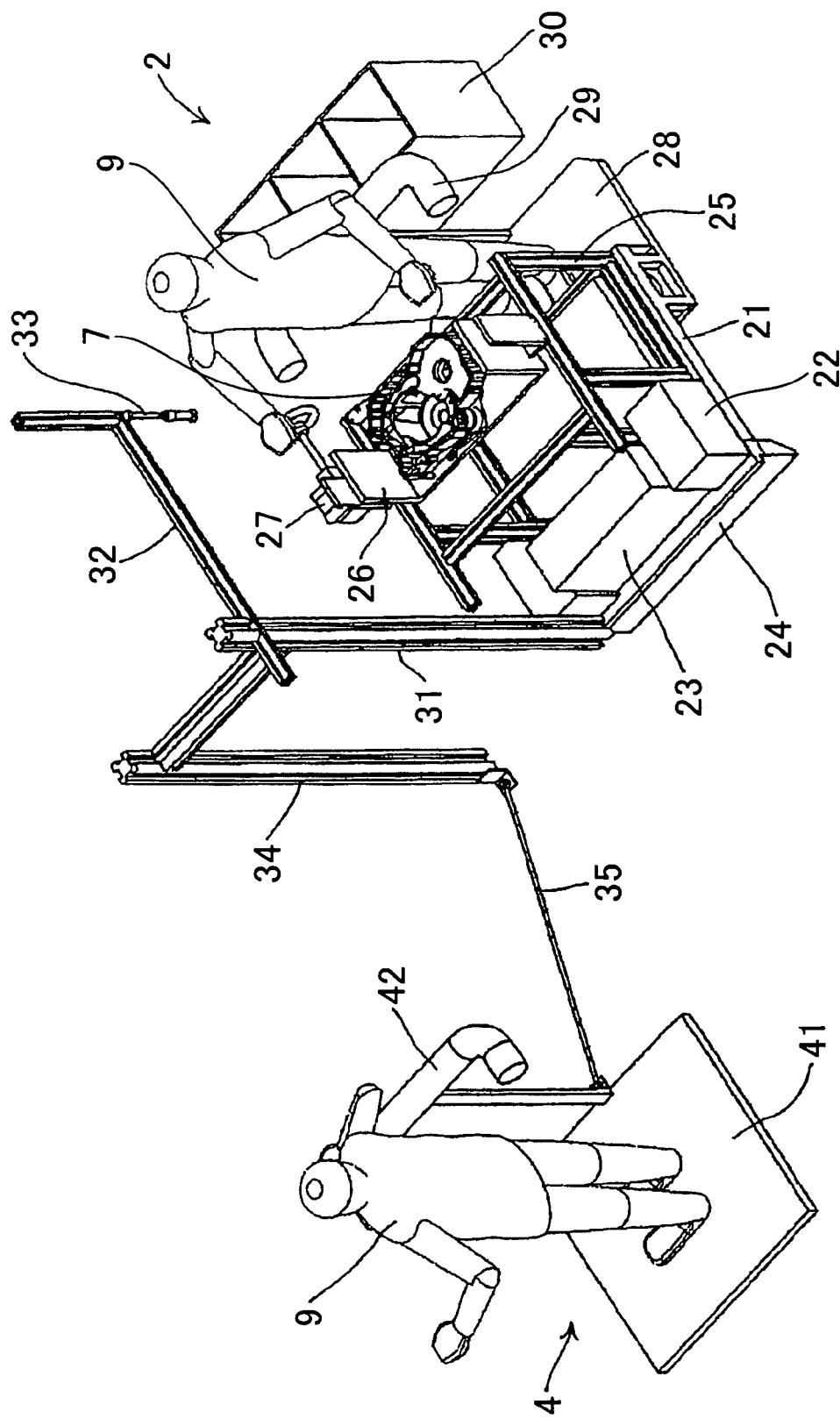
FIG. 2 is an enlarged perspective view for explaining the main car and the subsidiary car according to an exemplary embodiment.

Next, the structure of the main car 2 and the subsidiary car 4 will be explained with reference to the explanatory drawing in FIG. 2. Travel wheels and a route detecting sensor (not illustrated) are provided on the main car 2 at the lower side of the car body portion 21, and a battery 22 and a travel control apparatus 23 are provided on the upper side thereof. Furthermore, a bumper 24 and a proximity sensor are provided on the lower front portion of the car body portion 21.

The circular route 11 of the main car 2 is set by attaching a magnetic tape to the floor. The route detecting sensor detects the magnetic tape and a detection signal is transmitted to the travel control apparatus 23. Based on this detection signal, the travel control apparatus 23 controls the direction and speed of the travel wheels, and it is thereby possible to travel along the circular route 11. The proximity sensor detects obstacles and other main cars that are in front, and the detection signal is transmitted to the travel control apparatus 23. The travel control apparatus 23 is structured such that deceleration or stopping is carried out as necessary in order to avoid collisions, and safety is ensured.

A frame body portion 25, which is structured by assembling mold steel, is erected on top of the car body portion 21 of the main car 2, and the workpiece holding portion 26 and the workpiece adjusting portion 27 are erected on the frame body portion 25. The workpiece holding portion 26 holds the case 7 of a transmission, which is the workpiece. The case 7 is attached and released by the workpiece adjusting portion 27, and the adjustment of the height and position can also be carried out. Thereby, the operator 9 can fasten the case 7 at an appropriate height and position to carry out the operation. In addition, manual driving is also enabled by providing a driving portion on the back surface of the frame body 25.

A riding portion 28, on which an operator 9 can ride, extends out from the lower bottom portion of the car body portion 21 of the main car 2. In addition, a handrail 29 that is supported in an upward direction on the back portion of the riding portion 28 is provided, and thereby ensures the safety of the operator 9 who is riding and provides a convenient and stable operation position. Furthermore, a box-shaped accommodating portion 30 is provided behind the handrail 29, and tools and parts can be accommodated therein.

A support member 31 is provided in a perpendicular direction on the right front of the car body portion 21 of the main car 2, and an arm 32 is provided that overhangs in the horizontal direction from the upper end of the support member 31. A lifting jig 33 is provided on the distal end of the arm 32. The arm 32 can rotate in the horizontal direction, and an operation in which the parts and the jigs are lifted from the station and attached to the case 7 can be carried out easily.

A linking member 34 is erected facing the side from midway along the supporting member 31, and the linking member 34 turns downward at a position thereon. A linking rod 35 is disposed facing forward from the lower end of the linking member 34, and the distal end of the linking rod is linked to the car body portion 41 of the subsidiary car 4. The linking member 34 and the linking rod 35 correspond to the linking rod that physically links the subsidiary car 4 and the main car 2. A downward facing bracket-shaped gate is formed by the supporting member 31 and the connecting member 34. This gate is for preventing interference with stations that are disposed between the circular routes 11 and 12.

On the subsidiary car 4, route guidance wheels and travel wheels (not illustrated) are provided on the bottom side of the car body portion 41. The circular route 12 of the subsidiary car 4 is defined by providing guide grooves in the floor surface. The route guidance wheels are structured so as to fit into and be guided by the guide rail that is mounted on the floor along the circular route 12. In contrast, wheels whose forward direction freely changes are used for the travel wheels, and they can travel along the circular route 12. The method of defining the circular route 12 may also provide a guide groove or a guide wall rather than a guide rail, and the subsidiary car travels therealong.

According to the structure described above, when the main car 2 travels, the driving force is transferred to the subsidiary car 4 via the support member 31, the linking member 34, and the linking rod 35. Therefore, the subsidiary car 4 can travel together with the main car 2 in front thereof.

In addition, in the subsidiary car 4, the upper surface of the car body portion 41 doubles as a boarding portion. A handrail 42 is provided that is supported in an upward direction on the back portion of the car body portion 41, and ensures the safety of the operator 9 who is riding and provides a convenient and stable operation position.

Figure 3:
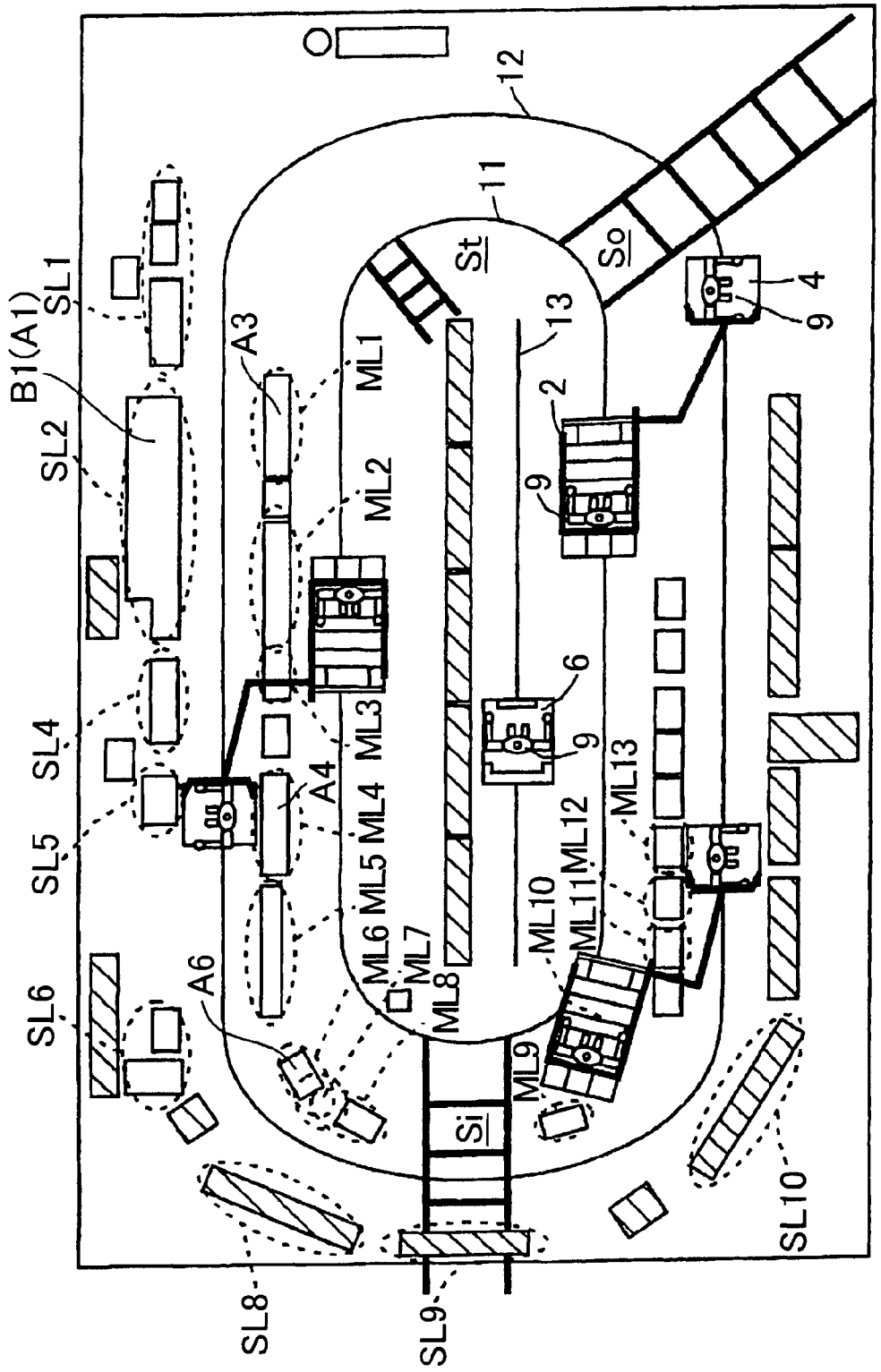
FIG. 3 is a planar drawing that shows the configuration of the cell manufacturing facility according to an exemplary embodiment.

Next, an exemplary method by which the transmission is manufactured by using the transmission manufacturing facility 1 described above will be explained. The planar drawing in FIG. 3 is a configuration diagram showing the configuration of the transmission manufacturing facility 1 that is shown in FIG. 1. In FIG. 3, the square shapes with diagonal lines indicate accommodation spaces for parts and members, and the unmarked squares indicate operation platforms and mounting platforms for transferring the parts and/or jigs. The reference symbols ML1 to ML13 show the operation steps in the main operations, and in FIG. 3, the approximate positions at which the parts and/or jigs are received are shown. By receiving parts at these positions, it is possible to carry out the installation operation in the case 7 that is held on the main car 2. The reference symbols SL1 to SL10 show the operation steps of the subsidiary operations, and in FIG. 3, the positions of the operation platforms corresponding to the operation steps SL1 to SL10 are shown. On these operation platforms, subsidiary operations can be carried out in which the parts and/or jigs that are necessary for the main operations are prepared. It is noted that the part accommodation spaces, the operation platforms, and the mounting platforms described above correspond to stations.

FIG. 4 is an operation step overview list showing in sequence each of the operation steps for transmission manufacture. FIG. 4 also shows relationships between the main operations and the subsidiary operations. Specifically, FIG. 4 shows that the parts and/or jigs that have been prepared by subsidiary operations are used in the main operations and are denoted by identical numerals. For example, FIG. 4 shows that the part referred to as the B2 assembly, which is assembled in subsidiary operation SL1, is used in the main operation ML1. An empty column means that the subsidiary operation is unnecessary, for example. It will be appreciated that the word "assembly" means the intermediate parts that are pre-assembled into the component parts and the composite parts.

Although omitted in the operation steps overview list in FIG. 4, the case 7 for the transmission, which is the workpiece, is imported from outside the operation area and is mounted on the preprocessing car 6 at the import station Si. The preprocessing car 6 conveys the case 7 to the switching station St via the travel route 13, and the preprocessing is carried out while traveling. At the switching station St, the case 7 is switched from the preprocessing car 6 to the main car 2. Then the main car 2 and the subsidiary car 4 begin to travel, and the overall operation steps begin. Below, the operation steps will be explained in sequence.

Figure 5:
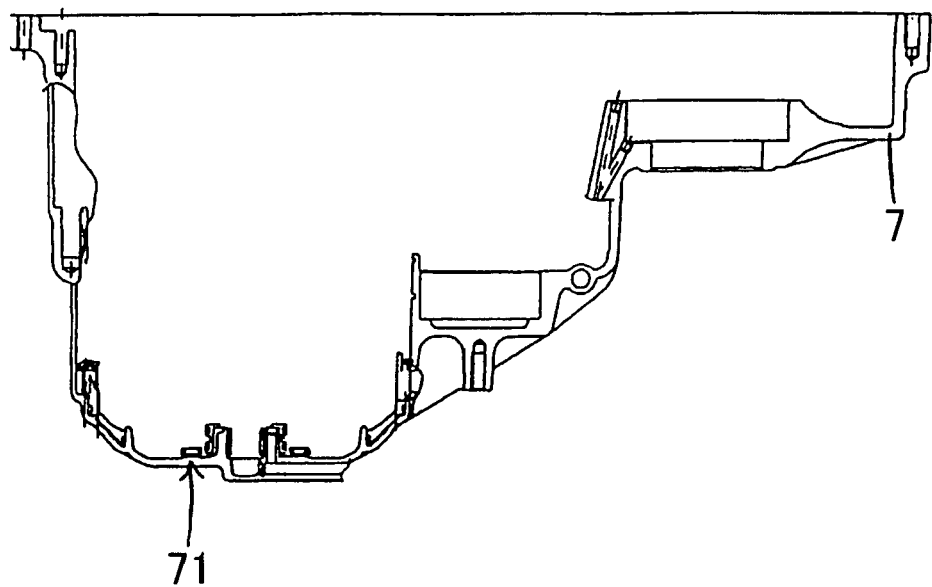
FIG. 5 is a drawing that shows the B2 assembly installation state during the transmission production according to an exemplary embodiment.

First, in the subsidiary operation SL1, the operator 9, who carries out the subsidiary operation, assembles the B2 assembly 71. The B2 assembly 71 involves a combined part for a brake portion. An O-ring, a return spring, and a snap ring are installed in the B2 piston, and this is held as a whole by an installation jig and is mounted on a mounting platform. Then, in main operation M1, the operator 9, who carries out the main operation, takes the B2 assembly 71 on the mounting platform and installs it in the case 7. Thus, the cross-section of the case 7, which is the workpiece, is then in the B2 assembly installation state that is shown in FIG. 5.

The subsidiary operation SL1 described above is carried out on the traveling subsidiary car 4, and the main operation ML1 is carried out on the traveling main car 2. Therefore, when the operation has finished, in order to reach the position of the next step, additional time is not needed to move between steps. In addition, the transfer of the B2 assembly 71 is carried out on the mounting platform that is disposed between the two operation cars 2 and 4, and the operators 9 do not need to wait while moving. Note that after the installation operation has been completed, the installation jig remains on the mounting platform, and is used in the next assembly. At this time, because the position of the main car 2 moves between the installation start time and completion time, the mounting platform is a movable type mounting platform, and automatically returns the installation jig to the position at which it was at the start of the installation.

The distribution of the operation steps and/or the transfer procedures for the parts and jigs described above is similar in the following operation steps. Note that in the case in which a long period of time is required for particular operation steps, the operation cars 2 and 4 may be temporarily stopped.

Figure 6:
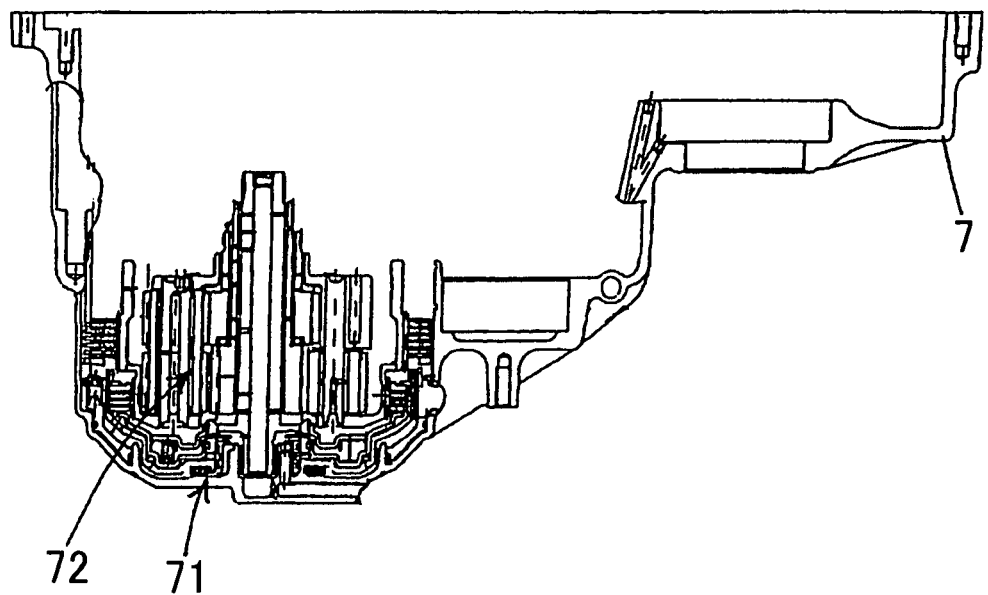
FIG. 6 is a drawing that shows the rear sub-installation state according to an exemplary embodiment.

In the subsidiary operation SL2, the rear sub-assembly 72, which structures a portion of the shifting gear, a clutch portion, and the brake portion, is assembled. In the rear sub-assembly 72, bearings, spacers, a planetary gear assembly, and a brake plate are installed around the shaft of the clutch portion, and these are held by an installation jig. In the main operation ML2, the rear sub-assembly 72 is installed in the case 7, and the workpiece is then in the rear sub-installation state that is shown in FIG. 6.

The next main operation ML3 is an operation step in which dimensions are confirmed and parts are selected, and does not require any subsidiary operations. Specifically, the operator 9, who carries out the main operation, uses a plate thickness measuring jig, and measures the thickness of the B2 brake shown in FIG. 7. At this time, in order to suppress warping of the friction members of the multi-plate brake, the overall thickness of the brake is measured while compressing the jig. Next, based on the results of the measurement, a backing plate 73 having the appropriate thickness is selected so as to offset the individual differences in the thickness of the brakes. Thereby, the individual differences present during the brake manufacture can be compensated, and it is possible to make the pull the brakes uniform.

Figure 8:
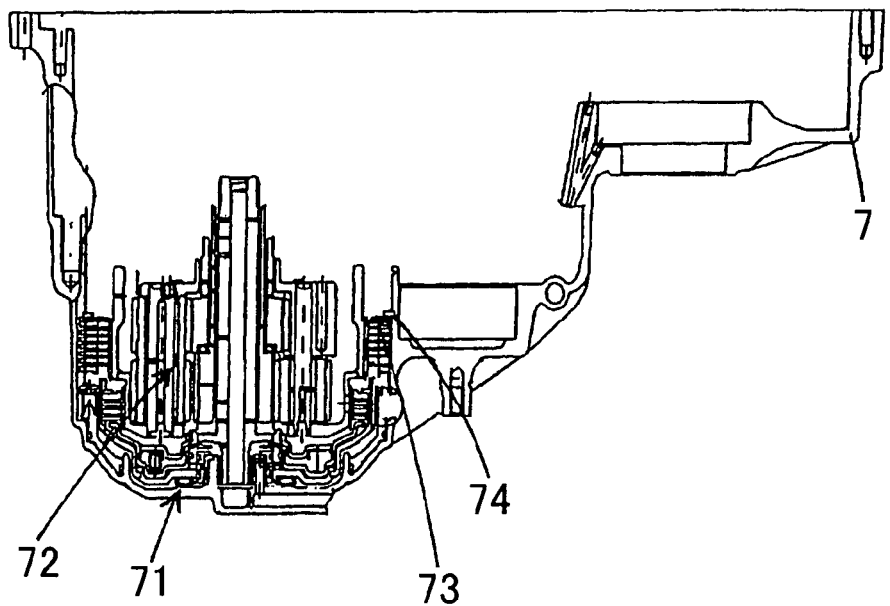
FIG. 8 is a drawing that shows the backing plate installation state according to an exemplary embodiment.

In the next subsidiary operation SL4, the snap ring 74 is prepared. The snap ring 74 that is used here is a type that fits into a groove in the inner surface of a cylinder, and it is necessary to make the outer diameter of the snap ring 74 smaller than the cylinder diameter by using a snap ring positioning jig. Furthermore, because this structure is not rotationally symmetric, the alignment of the jig (the angle in the circumferential direction in the cylinder) during installation is also adjusted. In the main operation ML4, the backing plate 73 that was selected in the previous step is incorporated, and the snap ring 74 that was received from subsidiary operation SL4 is inserted. As a result, the workpiece is then in the backing plate installation state that is shown in FIG. 8.

Figure 9:
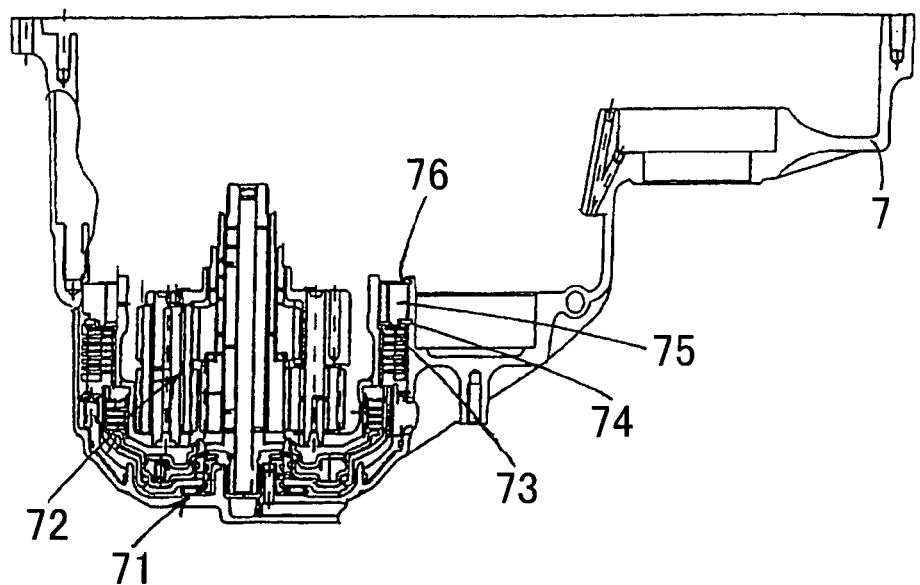
FIG. 9 is a drawing that shows the one-way-clutch installation state according to an exemplary embodiment.
Figure 10:
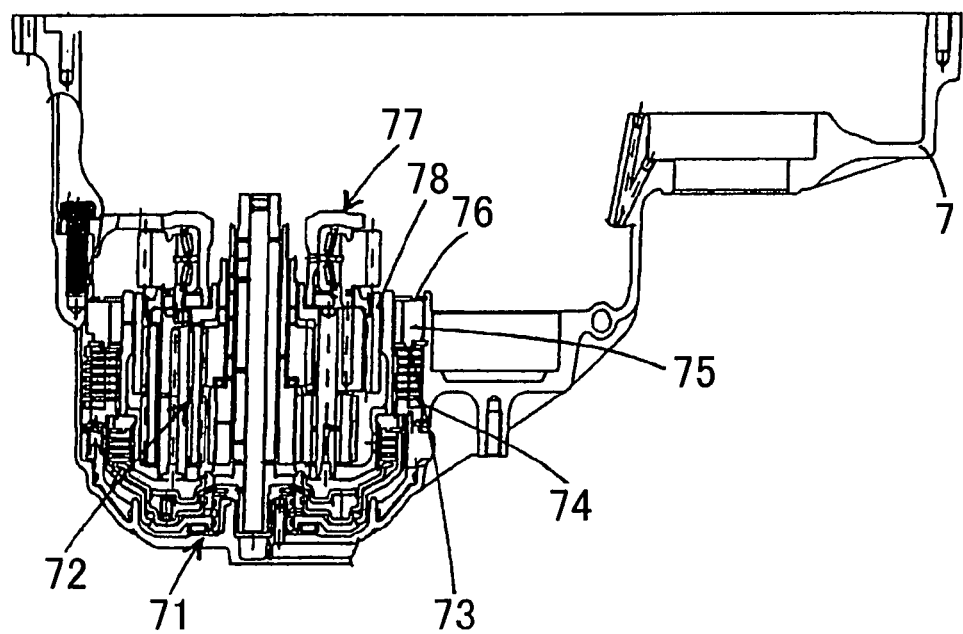
FIG. 10 is a drawing that shows the counter gear installation state according to an exemplary embodiment.

In subsidiary operation SL5, the one-way-clutch 75 and the snap ring 76 are set in the snap ring diameter reduction jig. Similarly to the previous step, the reduction of the diameter and alignment adjustment of the snap ring 76 are carried out. In the main operation ML5, the one-way-clutch 75 and the snap ring 76 are installed. At this time, because a jig is used, it is possible to install both parts at one time, and the operation efficiency is high. As a result, the workpiece is then in the one-way-clutch installation state that is shown in FIG. 9.

In subsidiary operation SL6, the counter gear assembly 77 is assembled. In the main operation ML6, first, the center support 78 is inserted. Next, the counter gear assembly 77 is incorporated, and the bolt 79 is tightened and fastened. The tightening of the bolt 79 is carried out by using an electric screw driver on the stationary station side. As a result, the workpiece is then in the counter gear installation state shown in FIG. 10.

Figure 11:
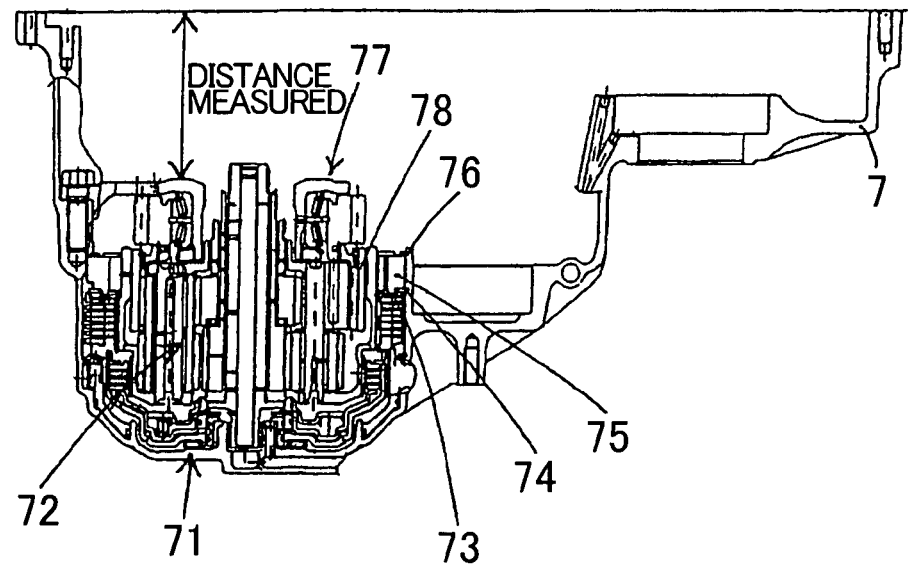
FIG. 11 is an explanatory drawing that shows the method in which the inclination of the counter gear is measured according to an exemplary embodiment.

The next main operation ML7 is an operation step in which the dimensions are confirmed, and this does not require a subsidiary operation. Specifically, as shown in FIG. 11, the distance between the upper end of the counter gear assembly 77 and the upper end of the case 7 is measured. At this time, the measurement is carried out while rotating the counter gear one time, and it is confirmed whether the counter gear assembly 77 is installed at an angle. In order to carry this out with a high efficiency, a measuring apparatus is used that has an automatic measuring function that intermittently measures at short intervals and a processing function that finds, for example, the average value of the measured data.

Figure 12:
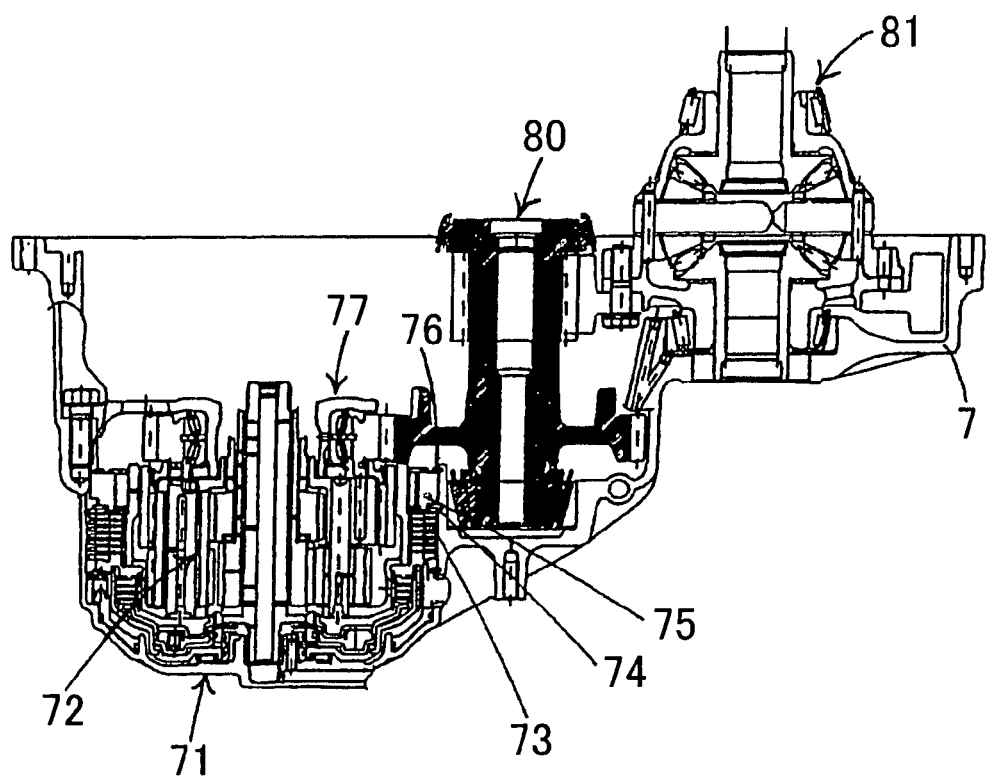
FIG. 12 is a drawing that shows the differential installation state according to an exemplary embodiment.
Figure 13:
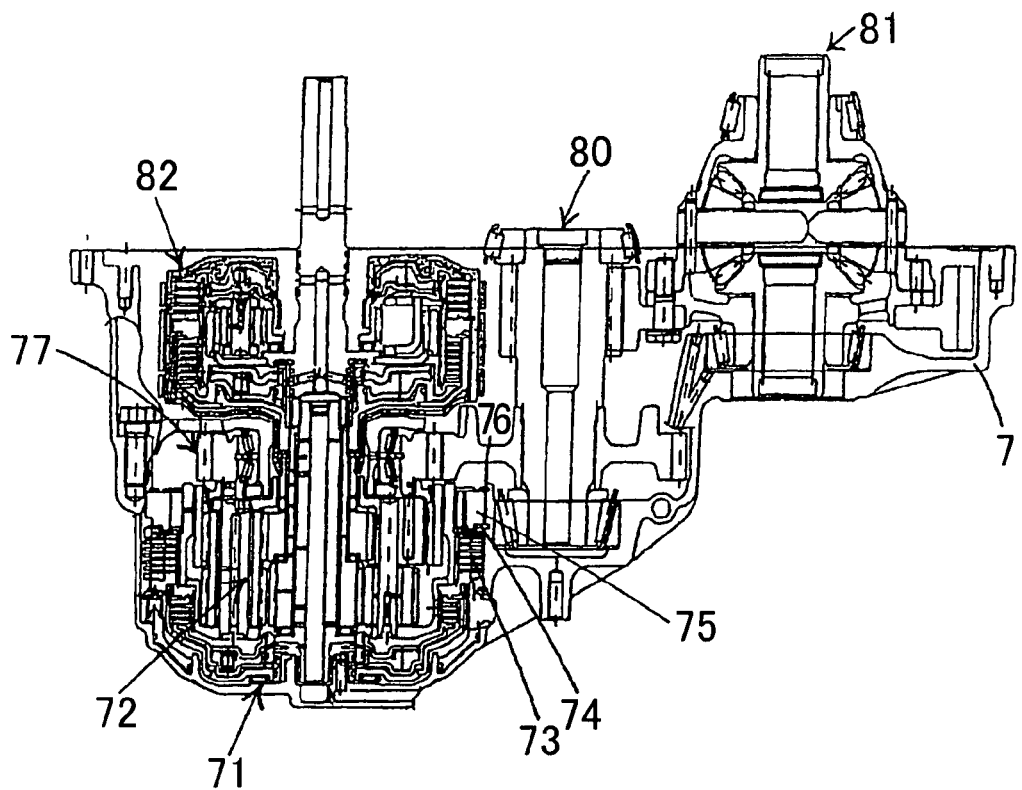
FIG. 13 is a drawing that shows the front sub-installation state according to an exemplary embodiment.

In the next subsidiary operation SL8, the drive pinion assembly 80 and the diff assembly (differential apparatus assembly) 81 are assembled. In the main operation ML8, the two assemblies 80 and 81 are installed, and the workpiece is then in the differential installation state that is shown in FIG. 12.

In subsidiary operation SL9, the front sub-assembly 82 and the C3 assembly (clutch portion) are assembled. In the main operation ML9, the front pre-assembly 80 and the C3 assembly are installed in the case 7, and then the drive sun gear and the B1 band brake are installed. As a result, the workpiece is in the front pre-assembled state shown in FIG. 13.

Figure 14:
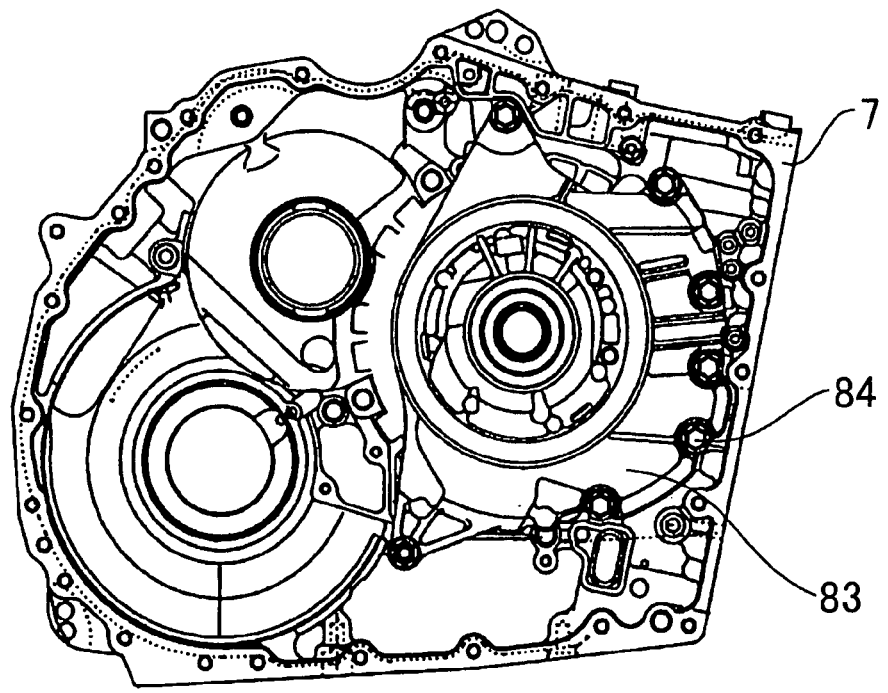
FIG. 14 is an explanatory drawing that shows the method in which the oil pump is installed according to an exemplary embodiment.
Figure 15:
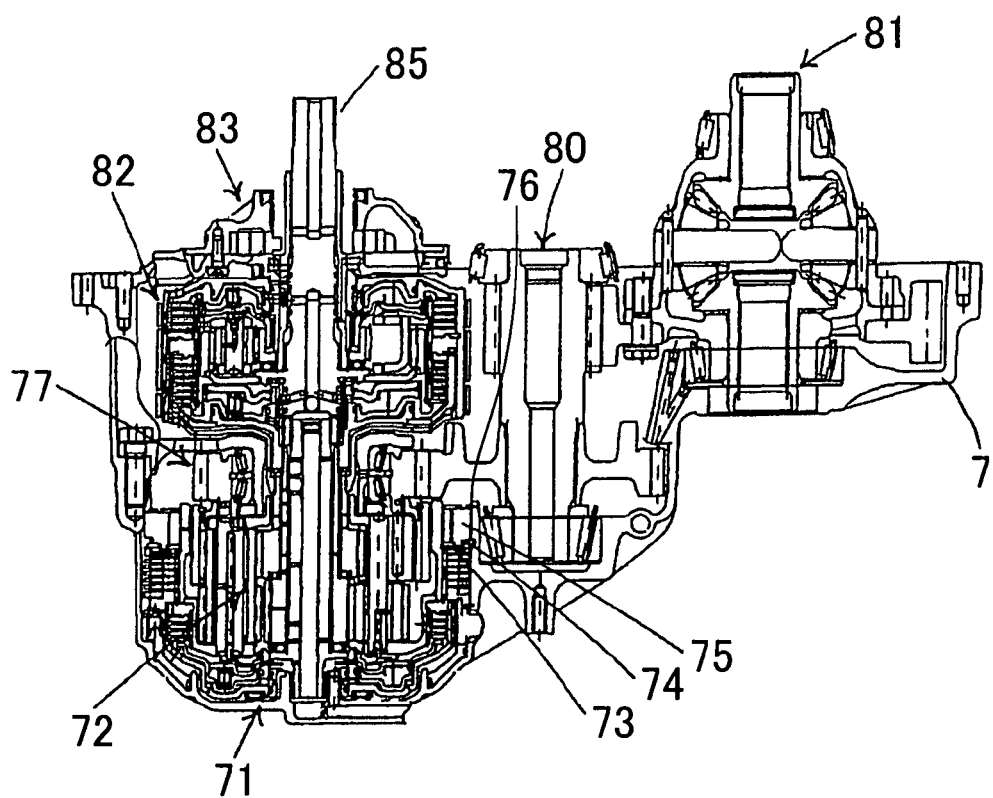
FIG. 15 is a drawing that shows the oil pump installation state according to an exemplary embodiment.

Next, in the subsidiary operation SL10, the oil pump assembly 83 is assembled. In the main operation ML10, 7 bolts shown in FIG. 14 are simultaneously partially tightened by using a bolt partial-tightening jig. Finally, the tightening is manually increased, but the operational efficiency can be greatly improved by using a temporary bolt tightening jig. As a result, the workpiece is in the oil pump installation state shown in FIG. 15.

In the main operation ML11, the shaft 85 is raised upward, the dimension of possible movement is measured, and it is confirmed that there is no deficiency in the parts around the shaft.

In the main operation ML12, using the band brake stroke measuring jig, the stroke of the B1 band brake is measured. With this jig, the displacement is found by pressing the engagement convexity of the B1 band brake, and the particular stroke of each brake is found.

In main operation ML13, the B1 piston assembly is installed, and the transmission is complete.

All of the operation steps are completed and the main car 2 and the subsidiary car 4 reach the export station So. Here, the completed transmission is exported by a separate conveying device, and it is delivered to the inspection step. Subsequently, the main car 2 and the subsidiary car 4 continue traveling along the circular routes 11 and 12, and return to the switching station St. Then the new case is mounted and the next manufacturing cycle starts.

In the transmission production facility 1 of the exemplary embodiments, the main car 2 and the subsidiary car 4 travel together, and the operation steps are divided and carried out. Thereby, it is possible to make a rational manufacturing method in which two operators 9 cooperate to manufacture one product. In addition, the amount of stored parts can be minimized, and it is possible to respond to the production of a single item or to perform a mixed production in which a plurality of models is fabricated. Furthermore, even if the production model changes, there is the effect that it is possible to reconfigure the production line in a short period of time.

In addition, other than the travel of the cars and electric screw drivers, in the production facility, the use of additional power sources such as electrical power and compressed air is reduced whenever possible. Thus, far fewer actuators may be used than in a conventional facility and a reduction in energy consumption becomes possible. Furthermore, it will be appreciated that the space required for the operations is reduced.

Next, in the case in which the main car 2 in the present exemplary embodiment transits the circular route 11 continually, a main delivery apparatus is provided in order to facilitate the repeated use of the same jigs. In addition, similarly, in the case in which the subsidiary car 4 transits the circular route 12 continually, a subsidiary delivery apparatus is provided in order to facilitate the repeated use of the same jigs. Various modes are possible for this main delivery apparatus and subsidiary delivery apparatus. Embodiments thereof will be explained.

Figure 16:
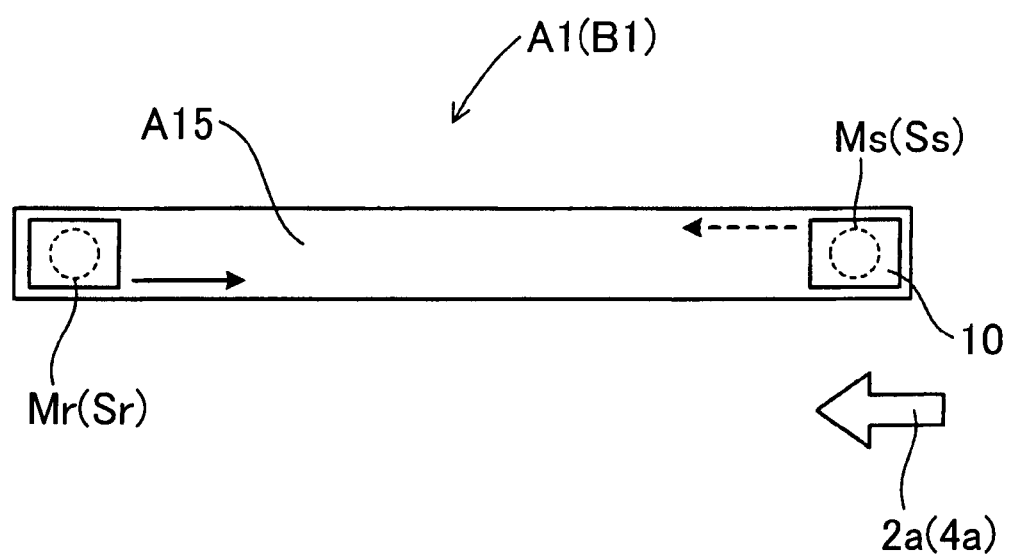
FIG. 16 is an explanatory drawing that shows the structure of the main delivery apparatus according to an exemplary embodiment.

As shown in FIG. 16, the main delivery apparatus A1 can be used, for example, when an operation is carried out that is similar to the case in which the subsidiary operation SL2 in FIG. 3 described above is carried out. As shown in FIG. 16, the main delivery apparatus A1 is an apparatus in which, among a main serving position Ms, at which a jig that is necessary for the main operation is transferred to the main car 2, and a main receiving position Mr, at which a jig is received from the main car 2, a jig that has been disposed at the main receiving position Mr is delivered to a main serving position Ms.

As shown in FIG. 16 to FIG. 19, the main delivery apparatus A1 has a main mounting platform A10 that can move between the main serving position Ms and the main receiving position Mr.

The main delivery apparatus A10 is disposed so as to be able to move along an inclined path A15 that inclines such that the height increases as the main receiving position Mr is approached from the main serving position Ms. In addition, the main mounting platform A10 structured so as to be linked to and move in synchrony with the main car 2 from the main serving position Ms to the main receiving position Mr, the state of linkage with the main car 2 is released at the main receiving position Mr, and thereby, the main delivery apparatus A10 moves along the inclined path A15 under its own weight, and returns to the main serving position Ms to stand by.

More specifically, as shown in FIG. 17 to FIG. 19, stoppers A151 and A152 are disposed at both ends of the inclined path A15, and the main mounting platform A10 is disposed so as to be able to travel between these stoppers. Due to the effect of the inclination of the inclined path A15, normally the back end of the main mounting platform A10 abuts the stopper A151, that is, the main mounting platform A10 stands by at the lowest point.

The main mounting platform A10 consists of four wheels A102 that can freely rotate and a mounting platform body A101 that is disposed thereabove. A linking member A103 for linking to the main car 2 is disposed on the mounting platform body A101.

The linking member A103 is structured by a base plate A104 that is disposed perpendicularly, an abutting plate A105 that is disposed so as to be able to rotate with respect thereto centered on the hinge A109, and a spring A108 that is disposed between the base plate A104 and the abutting plate A105. In the case in which the abutting plate A105 is disposed at a position that allows abutting the engaging rod 215 disposed on the main car 2 and the main mounting platform A10 is positioned at the highest point abutting the stopper A152, the abutting position between the abutting plate A105 and the engaging rod 215 adjusted so as to be positioned below the hinge A109.

The sequence of actions in which a main car 2 continually uses the same jig by using the main delivery apparatus A1 having the structure described above will be explained with reference to FIG. 16 to FIG. 19.

First, as shown in FIG. 16, the main car 2 moves in the direction of the arrow 2a, and when the main car 2 is positioned at the side of the main serving position Ms, that is, at the side of the main mounting platform A10 that is positioned at the lowest point of the main delivery apparatus A1, as shown in FIG. 17 and FIG. 18, the engaging rod 215 described above abuts the abutting plate A105 of the main mounting platform A10, and subsequently, the main mounting platform A10 moves forward after interlocking with the movement of the main car 2.

In addition, when the main car 2 and the main mounting platform A10 are side by side, a jig on this main mounting platform A10 is moved to the main car 2. Then, while moving, at the main car 2, a main operation is carried out using the received jig. This main operation is carried out so as to be completed when or by the time that the main mounting platform A10, which is moving in synchrony with the main car 2, has reached the highest point. In addition, when or by the time that the main mounting platform A10, which is moving in synchrony with the main car 2, has reached the highest point, the jigs that are no longer in use are moved from the main car 2 onto the main mounting platform A10.

As shown in FIG. 18 and FIG. 19, when the main mounting platform A10, which is moving in synchrony with the main car 2, has reached the main receiving position Mr, which is at the highest point, and is abutting the stopper A152, the engaging rod 215 of the main car 2, which has moved farther forward, is pressed due to the abutting plate A105 overcoming the resistance of the spring A108, and the engagement is released. Thereby, as shown in FIG. 19, the main mounting platform A10, on which the jig is mounted, moves under its own weight from the main receiving position Mr, which is at the highest point, to the main serving position Ms, which is at the lowest point, and returns to the stand-by state.

Due to such a sequence of actions, the main car 2, which continually circulates, can always receive jigs at prescribed positions, subsequently the main operation can be carried out while moving, and then an operation can be carried out in which the jig is returned to the prescribed position that has been reached at the point in time in which the main operation has finished. Thus, the cell manufacturing method can be carried out extremely smoothly.

It is noted that it is possible to use a structure that is identical to the structure described above for the subsidiary delivery apparatus B1 that is used by the subsidiary car 4. In this case, for example, as shown in FIG. 16, the subsidiary car 4, which moves in the direction of the arrow 4a, and the main mounting platform A10, which serves as the subsidiary mounting platform, may be linked by a mechanism that is identical to that described above. In the following exemplary embodiments as well, similarly, a structure that was explained as a main delivery apparatus can be adopted as the subsidiary delivery apparatus as well.

Figure 20:
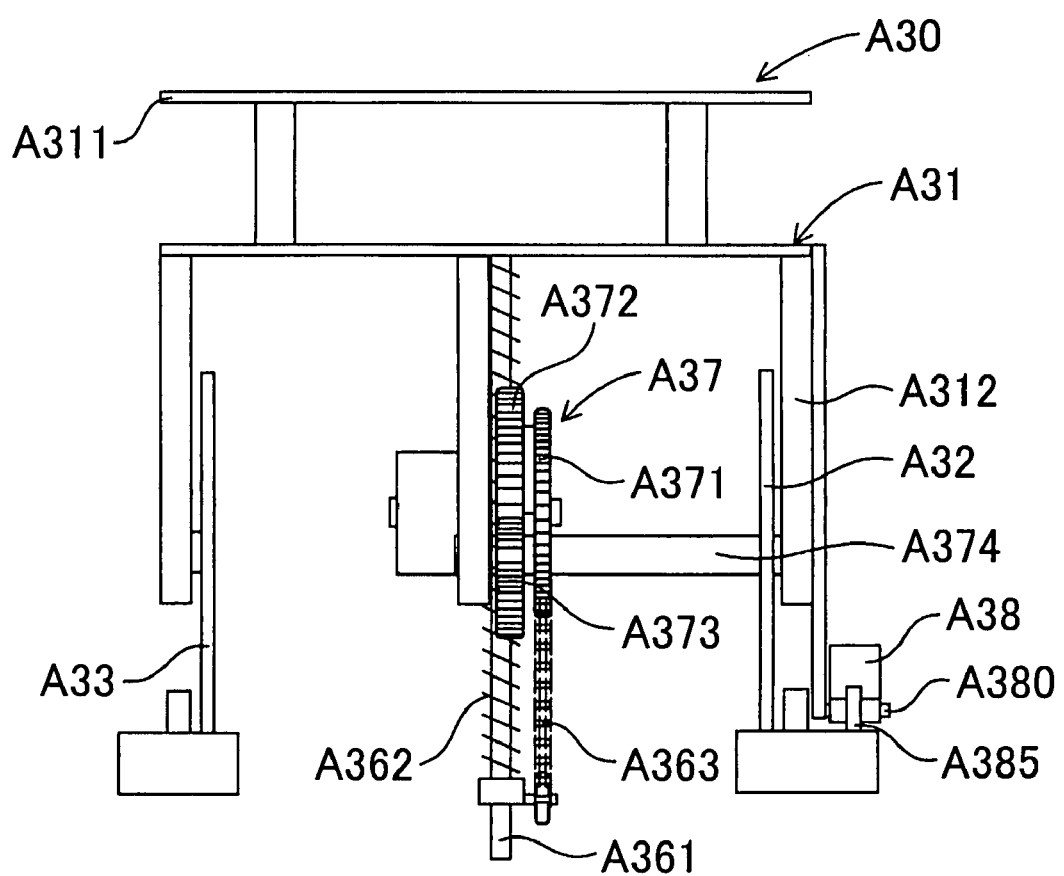
FIG. 20 is a front view that shows the structure of the energy storing-type main mounting platform according to an exemplary embodiment.
Figure 22A:
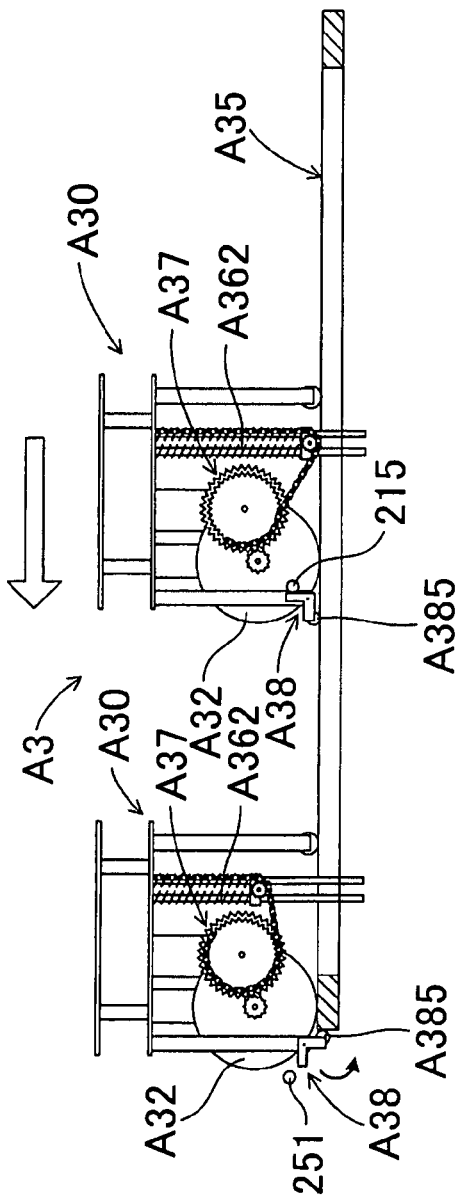
FIG. 22 is (a) a side view that shows the state in which the main mounting platform is moving forward and (b) is a planar view that shows the main mounting platform moving forward according to an exemplary embodiment.
Figure 22B:
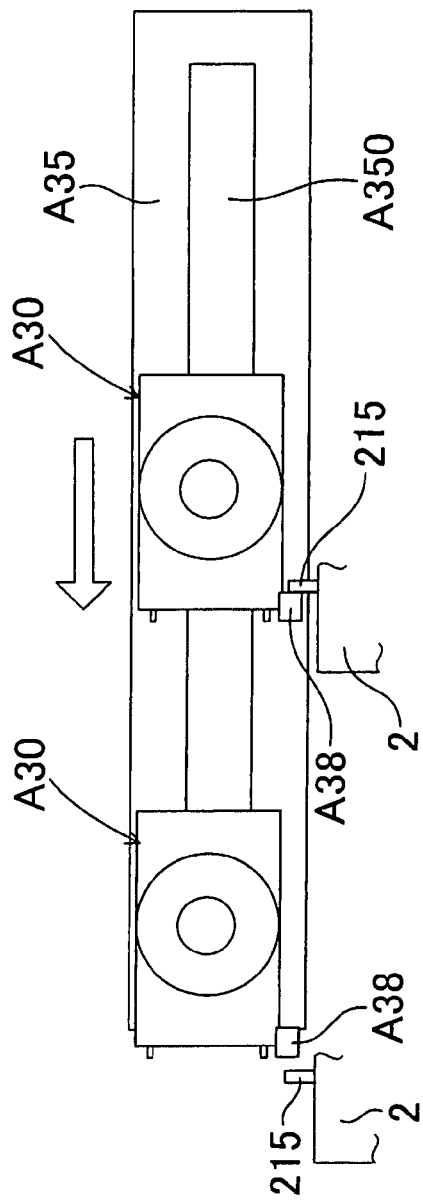

The main delivery apparatus A3 of a further exemplary embodiment can be used when, for example, carrying out an operation that is identical to the case in which the main operation ML1 in FIG. 3 described above is carried out. As shown in FIG. 20 to FIG. 22, this main delivery apparatus A3 is an energy storing type delivery apparatus.

As shown in FIG. 20 and FIG. 21, the main mounting platform A30 that is used in the main delivery apparatus A3 includes energy storing means that stores energy accompanying movement and kinetic energy converting means that converts the energy that has been stored in the energy storing means into kinetic energy that acts in a direction opposite to this movement. In addition, a path A35 in the main delivery apparatus A3 is disposed horizontally, and a through hole A350 for disposing the guide pole A361 of the main mounting platform A30, which will be described below, is provided at the center portion thereof.

As shown in FIG. 20 and FIG. 21, the mounting platform A30 includes a frame portion A31 that has a top plate A311, leg portions A312 and the like, a drive wheel A32, and a plurality of supporting wheels A33 that can rotate freely. In addition, energy storing means and kinetic energy converting means are structured by a spring A362 that is provided along a guide pole A361 and a gear set A37 that is linked via a chain A363 connected to the lower end thereof. The gear set A37 includes a gear A371 around which the chain A363 is wrapped and gears A372, A373 that rotate by interlocking therewith, and a drive shaft A374 that is provided with the gear A373 is linked to the drive wheel A32.

Furthermore, on the lower end of the leg portion A312, the main mounting platform A30 has a substantially L-shaped abutting member A38 that is able to engage with an engaging rod 251 provided on the main car 2. This abutting member A38 includes a first piece A381 and a second piece 382, and these are provided so as to be able to rotate centered on the hinge A380. On the distal end of the second piece A382, a standby wheel A385 that can freely rotate is provided, and normally the standby wheel A385 abuts the path A35.

Next, the action of the main mounting platform A30 will be explained.

As shown in FIG. 21A and FIG. 21B, when the main mounting platform A30 is linked to and moves in synchrony with the main car 2 from the start point to the end point, first, the linking rod 215 of the main car 2 abuts the first piece A381 of the abutting member A38 of the main mounting platform A30. At this time, because the standby wheel A385 abuts the path, the abutting member A38 is maintained so as to abut the linking rod 215. Thereby, the forward movement force of the main car 2 is transferred to the main mounting platform S30, and both move forward in synchrony.

As shown in FIG. 22, the drive wheel A32 rotates, the gear set A37 that is linked therewith also rotates depending on the forward movement of the main mounting platform A30, and the spring A362 is compressed via the chain A363. That is, the spring A362, which serves as the energy storing means, stores the energy.

When the main mounting platform A30 has reached the end point of the path A35, the standby wheel A385 of the abutting member A38 is separated from the path A35, and rotates forward. Thereby, the engagement between the engaging rod 215 of the main car 2 and the abutting member A38 is released, and the forward movement of the main mounting platform A30 stops. Then, the main mounting platform A30 begins to release the energy stored by the spring A362 due to the link with the main car 2 being released. Thereby, the drive wheel A32 is driven by the kinetic energy converting means such as the gear set A37, which stores energy, and the mounting platform A30 is moved forward to the original position (start point).

In this manner, due to having the mounting platform A30 that is provided with the energy storing means and the kinetic energy converting means described above, it is possible for the delivery apparatus A3 to act similarly to the type of delivery apparatus that uses the inclined path described above. Thus, similar to the case of the first embodiment described above, the main car 2, which continually circulates, can always receive jigs at a specified position, subsequently, the main operation is carried out while moving, and furthermore, and it is possible to carry out an operation in which a jig is returned at a specified position that has been reached at the point in time in which the main operation has completed.

Figure 23:
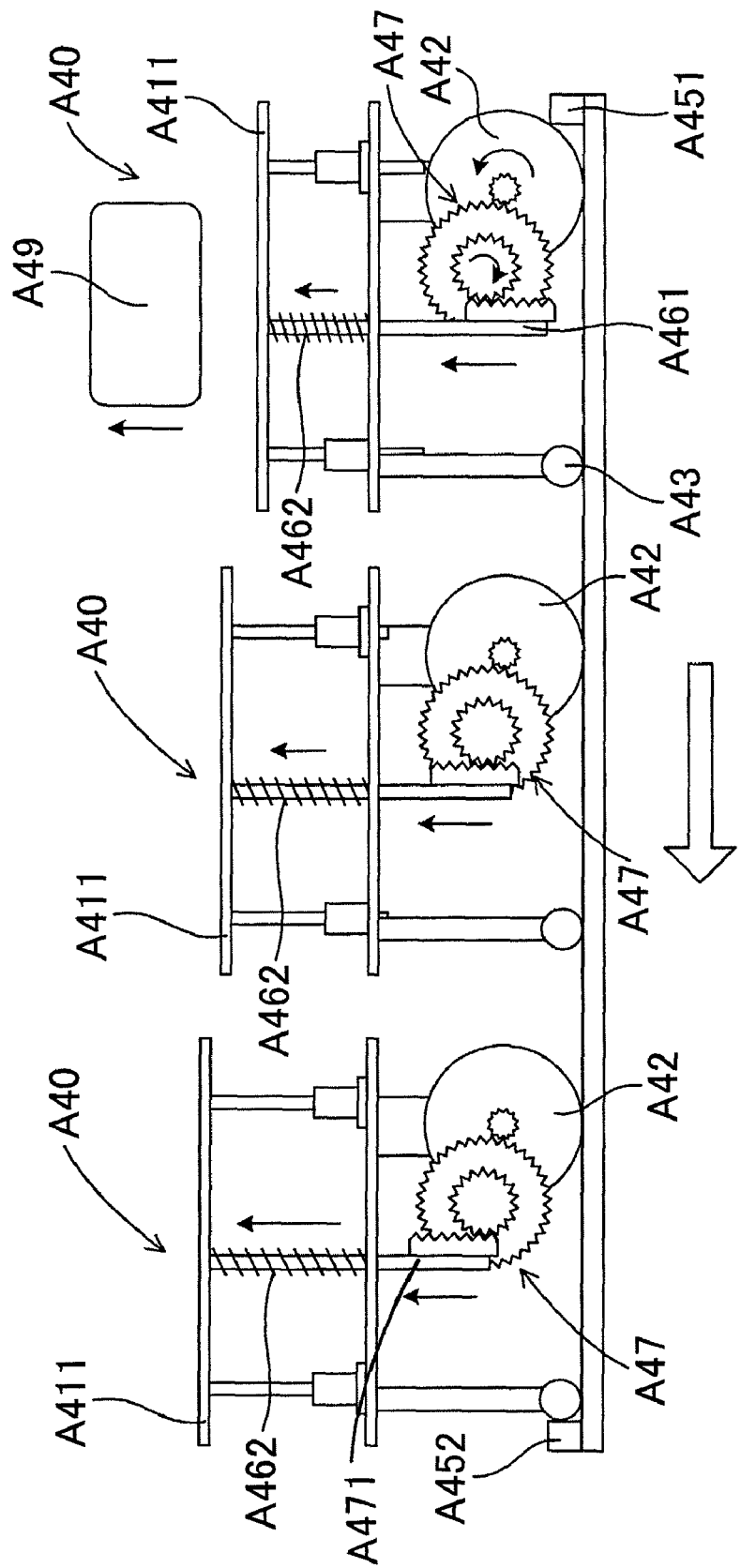
FIG. 23 is a side view that shows the state in which the main mounting platform is moving forward according to an exemplary embodiment.
Figure 24:
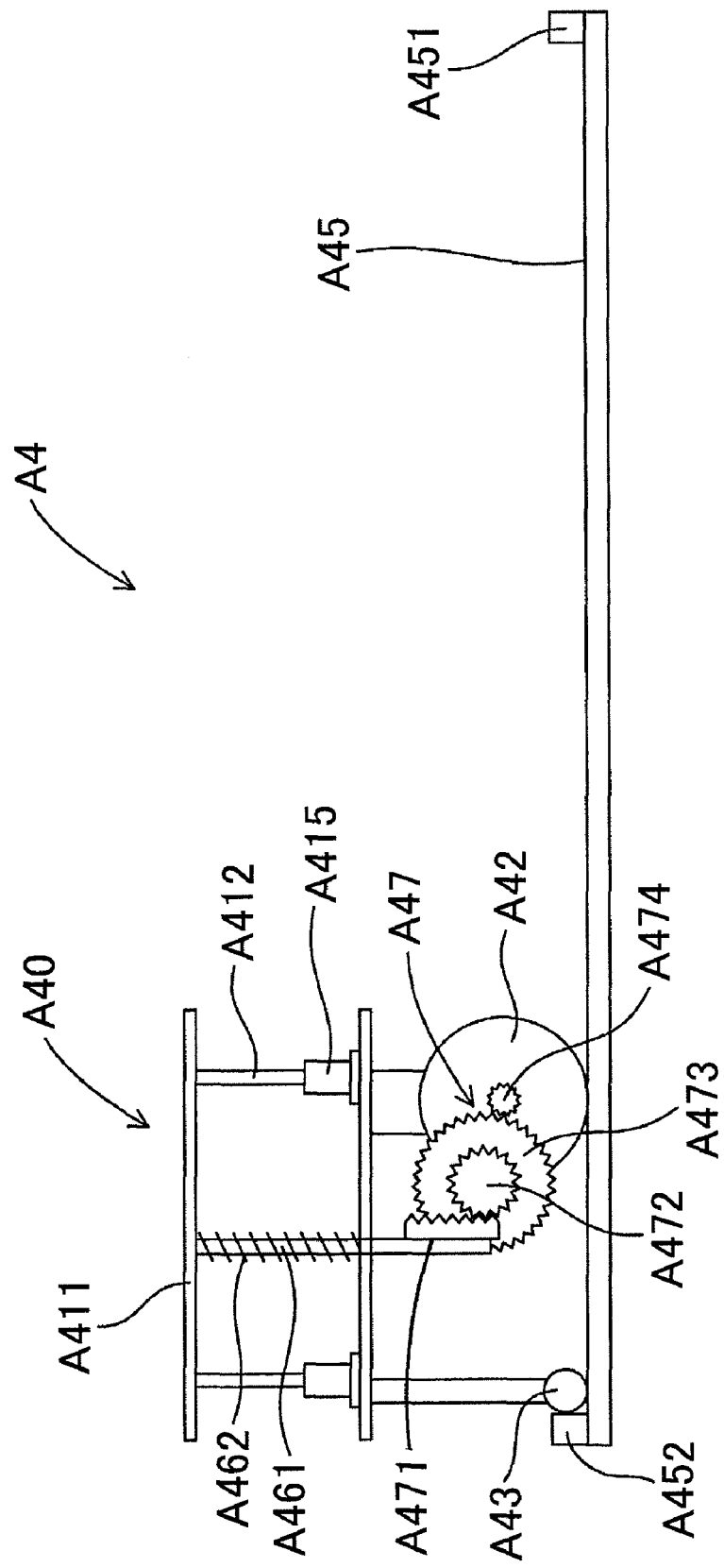
FIG. 24 is a side view that shows the structure of the automatic reciprocating-type main delivery apparatus according to an exemplary embodiment.
Figure 25:
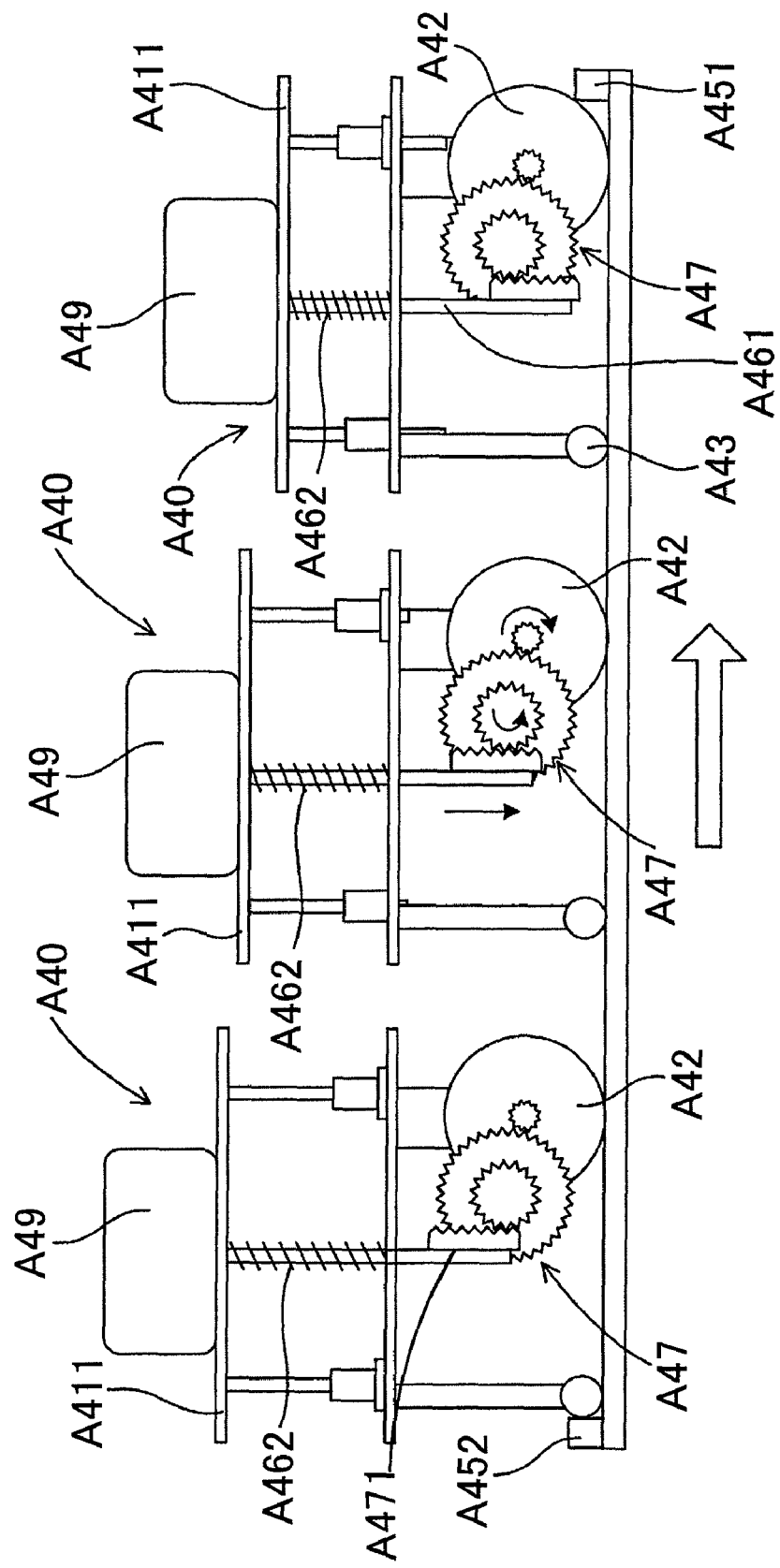
FIG. 25 is a side view that shows the state in which the main mounting platform is moving backward according to an exemplary embodiment.

The main delivery apparatus A4 of a further exemplary embodiment can be used when carrying out an operation that is similar to the case in which, for example, the main operation ML5 in FIG. 3 described above is carried out. As shown in FIG. 23 to FIG. 25, the main delivery apparatus A4 is an automatic reciprocating-type apparatus.

As shown in FIG. 24, the main delivery apparatus A4 includes a mounting platform 40 that can move along the path A45 that is provided with stoppers A451 and A452 at both ends. The mounting platform A40 moves under the weight of the parts and/or jigs mounted thereon, and includes energy storing means that stores energy and kinetic energy converting means that converts the energy that has been stored by the energy storing means into kinetic energy.

As shown in FIG. 23 to FIG. 25, the mounting platform A40 is held such that the top plate A411, which has the support rod A412, can be raised and lowered by a guide portion A415, and includes a drive wheel A42 and a plurality of freely rotatable support wheels A43. In addition, the energy storing means and the kinetic energy converting means are structured by a spring A462 that is disposed along the guide pole A461 and a gear set A47 that includes a rack gear A471 that is disposed on the bottom end of the guide pole A461. The gear set A47 is structured by the rack gear A471 and the gears A472, A473, and A474, which engage the rack gear A471 in sequence and are structured such that the rotation of the gear A474 is directly transferred to the drive wheel A42.

In addition, the mounting platform A40 is structured such that the top plate A411 is lowered by overcoming the urging force of the spring A462 due to parts and/or jigs that are mounted on the top plate A411, and by the parts and/or jigs being removed from the top plate A411, the top plate A411 is raised due to the urging force of the spring A462.

Next, the action of the main mounting platform A40 will be explained.

As shown in FIG. 23, by removing the jig A49 on the top plate A411 in the main mounting platform A40, the spring A462 begins to expand so as to release energy, and thereby, the top plate A411 and the guide pole A461 are raised, and the drive wheel A42 is driven via the gear set A47. Thus, the mounting platform A40 moves forward toward the departing point, and as shown in FIG. 24, it stops and returns to the standby state at the point in time in which the mounting platform A40 abuts the stopper A452.

Next, when the jig A49, which is no longer in use, is mounted on the top plate A411 of the main mounting platform A40 which is standing by at the end point, the top plate A411 and the guide pole A461 are lowered due to the weight thereof, and the drive wheel A42 is driven via the gear set A47. Thereby, the mounting platform A40 moves forward toward the start point. At this time, the spring A462 is compressed accompanying the lowering of the top plate A411, and energy is stored by the spring A462, which serves as the energy storing means.

Then, at the point in time in which the mounting platform A40 abuts the stopper A451 at the start point, the forward motion of the mounting platform A40 stops, and it returns to the standby state.

In this manner, because the delivery apparatus A4 includes a main mounting platform A40 that is provided with the energy storing means and the kinetic energy converting means described above, even if the main car 2 and the main delivery apparatus A4 are not in a linked state, it is possible to move them by using the weight of the jigs. In this case as well, by appropriately selecting the start point and the end point, it is possible to act similarly to the type of delivery apparatus that uses the inclined path described above. Thus, similar to the embodiments described above, the main car 2, which continually circulates, can always receive a jig at a specified position, subsequently, the main operation is carried out while moving, and furthermore, it is possible to carry out an operation in which a jig is returned at a specified position that is reached at the point in time in which the main operation has been completed.

Figure 26:
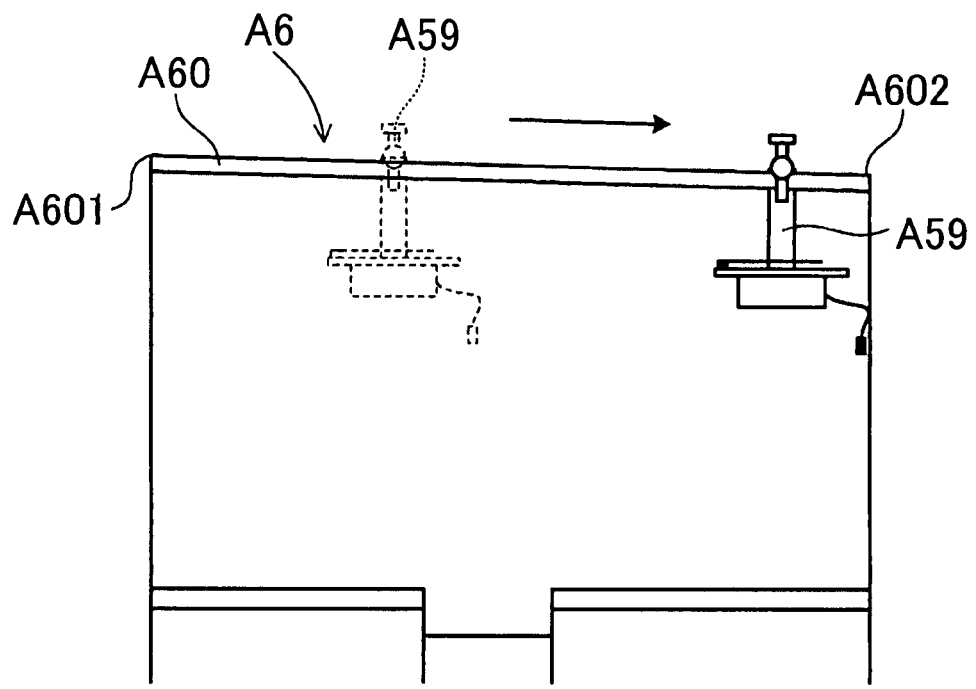
FIG. 26 is a side view that shows the state in which a jig is moving forward due to the rail-type main delivery apparatus according to an exemplary embodiment.
Figure 27:
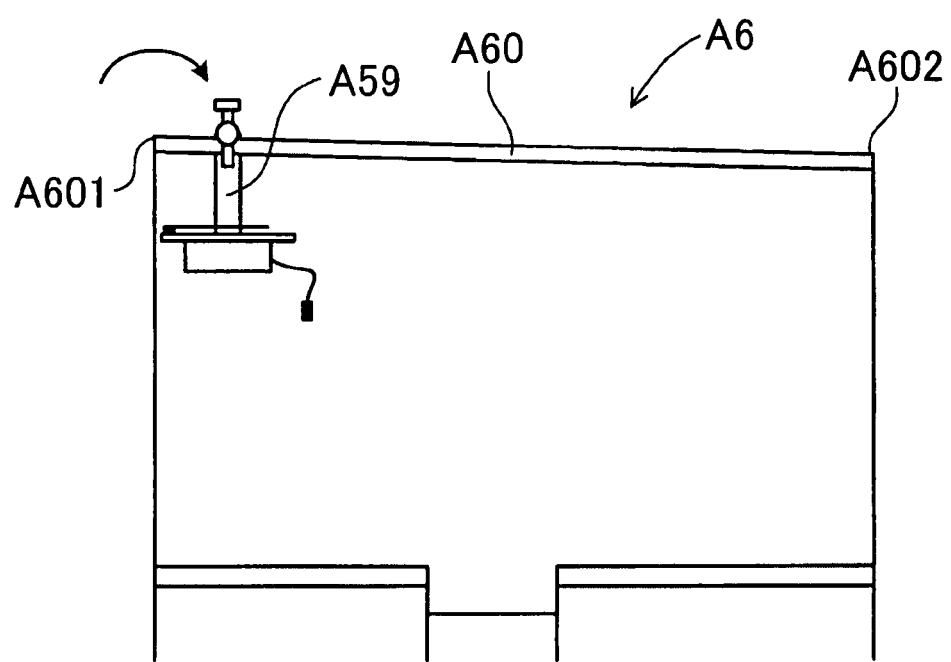
FIG. 27 is a side view that shows the state in which a jig is engaged to a rail-type main delivery apparatus according to an exemplary embodiment.
Figure 28:
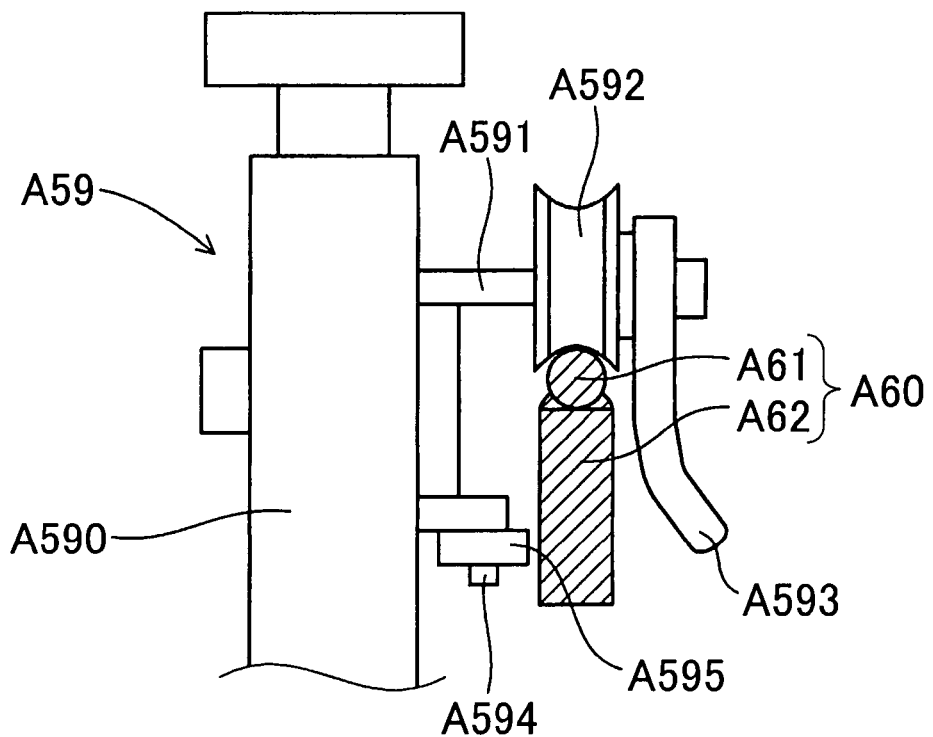
FIG. 28 is an explanatory drawing that shows the structure of a jig that can be used on the rail-type main delivery apparatus according to an exemplary embodiment.

The main delivery apparatus A6 of a further exemplary embodiment can be used when, for example, carrying out an operation that is similar to the case in which the main operation ML6 in FIG. 3 described above is carried out. As shown in FIG. 26 to FIG. 28, this main delivery apparatus A6 is a rail-type main delivery apparatus.

As shown in FIG. 26, the main delivery apparatus A6 includes a main rail A60 that inclines such that the height decreases as the end point 602 is approached from the start point 601. As shown in FIG. 28, the main rail A60 is structured by a round rod member A61 and a reinforcing plate member A62 that is welded to the bottom thereof.

Figure 29:
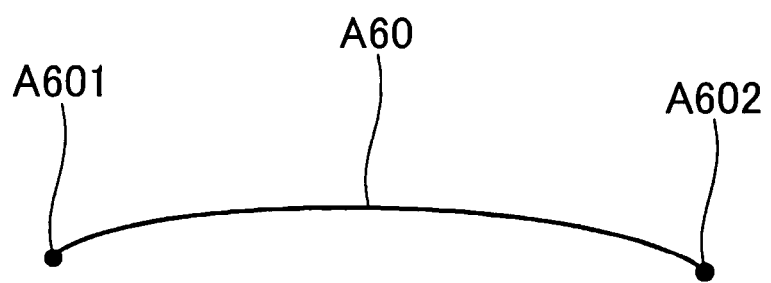
FIG. 29 is a planar drawing that shows the shape of the main rail according to an exemplary embodiment.

In addition, as shown in FIG. 29, the main rail A60 is not linear when viewed from above, but forms a curved shape.

In addition, as shown in FIG. 28, the jig A59, which is suspended on the main rail A60 and can travel along the main rail A60, is moved by this main delivery apparatus A6.

As shown in FIG. 28, the jig A59 includes a pulley A592 that is disposed so as to be able to rotate centered on the support pin A591, which extends toward the side of the shank portion A590, and a guide plate A593. In addition, the jig A59 also includes a standby wheel A595 that is disposed so as to be able to rotate centered on the support pin A594.

Next, the action of the jig A59 that uses this main delivery apparatus A6 will be explained.

As shown in FIG. 26, first, when the jig A59, which has been used by a previous main operation in the main car 2 and is no longer in use, engages in proximity to the start point A601 of the main rail A60 of the delivery apparatus A6, the jig A59 moves under its own weight toward the end point A602 while the pulley A692 that rides the rail A60 rotates, and in proximity to the end point A602, stops and returns to the standby state.

Next, as shown in FIG. 26, the next main car 2 receives the jig A59 that is in the standby state, and a main operation carried out while moving. As shown in FIG. 27, after the main operation has been completed in the main car 2, the jig A59 that is no longer in use is engaged in proximity to the start point A601 of the main rail A60 of the main delivery apparatus A6. The jig A59 moves under its own weight toward the start point A602 while the pulley A592 that rides the main rail A60 rotates. Then, as shown in FIG. 26, in proximity to the start point A602, the jig A59 stops and returns to the standby state.

In this manner, the main delivery apparatus A6 can be used as a delivery apparatus in the case in which a part and/or jig that can engage the main rail A60 is moved. Thus, in the case in which such a part and/or jig is used, it is possible to function similarly to the type of delivery device that uses the inclined path described above. Therefore, similar to the first embodiment described above, the main car 2 that continually cycles can always receive a part and/or jig at a specified position, subsequently, a main operation is carried out while moving, and furthermore, it is possible to carry out an operation in which a part and/or jig is returned at a position that is reached at the point in time in which the main operation has been completed.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

Figure 7:
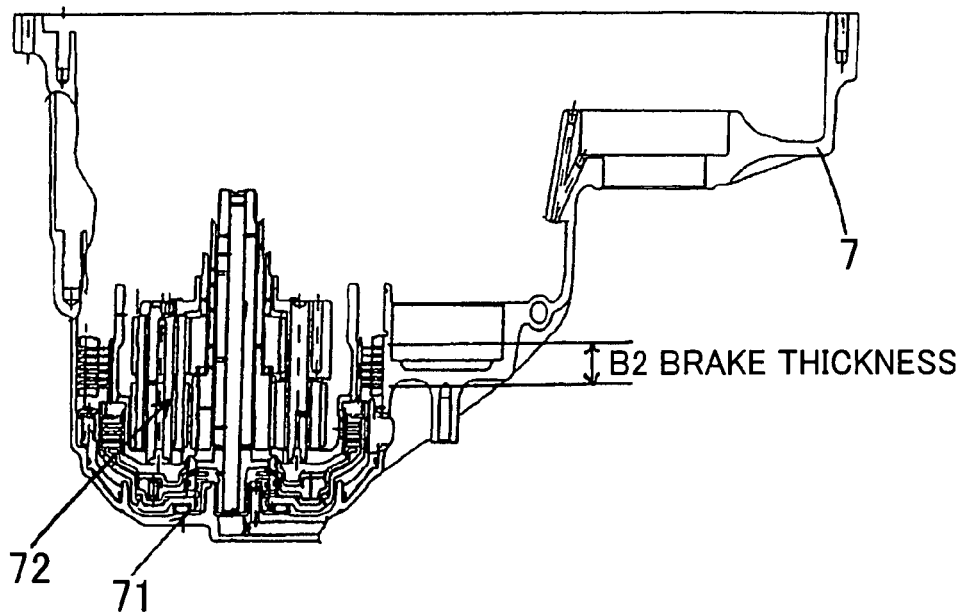
FIG. 7 is an explanatory drawing that shows the method in which the thickness of the B2 brake is measured according to an exemplary embodiment.

FIG. 4
1/ OPERATION STEPS OVERVIEW LIST
2/ MAIN OPERATION
3/ SUBSIDIARY OPERATION
4/ SYMBOL
5/ NAME
ML1 B2 PISTON AND SNAP RING ASSEMBLED
ML2 REAR SUB-ASSEMBLY ASSEMBLED
ML3 B2 BRAKE PLATE THICKNESS MEASURED AND B2 BACKING PLATE SELECTED
ML4 B2 BACKING PLATE AND SNAP RING ASSEMBLED
ML5 F1 ONE-WAY CLUTCH AND SNAP RING ASSEMBLED
ML6 CENTER SUPPORT AND COUNTER GEAR ASSEMBLY ASSEMBLED
ML7 COUNTER GEAR INCLINATION MEASURED
ML8 DRIVE PINION ASSEMBLY ASSEMBLED FOR THE DIFF
ML9 FRONT ASSEMBLY DRIVE SUN GEAR AND B-1 BAND BRAKE ASSEMBLED
ML10 OIL PUMP ASSEMBLY BOLT TIGHTENED
ML11 END PLAY MEASURED
ML12 B1 BAND BRAKE STROKE MEASURED
M13 B1 PISTON ASSEMBLY ASSEMBLED
SL1 B2 ASSEMBLY ASSEMBLED
SL2 REAR SUB-ASSEMBLY ASSEMBLED
SL4 SNAP RING PREPARED
SL5 ONE-WAY CLUTCH AND SNAP RING PREPARED
SL6 COUNTER GEAR ASSEMBLY ASSEMBLED
SL8 1) DRIVE PINION ASSEMBLY ASSEMBLED
    2) DIFF ASSEMBLY ASSEMBLED
SL9 FRONT SUB-ASSEMBLY ASSEMBLED
SL10 OIL PUMP ASSEMBLY ASSEMBLED
FIG. 7
B2 BRAKE THICKNESS
FIG. 11
DISTANCE MEASURED

The invention claimed is:

1. A cell manufacturing method in which a main operator, who carries out main operations including a plurality of steps in which parts are installed on a workpiece, is moved along with the workpiece so as to transit a plurality of stations at which auxiliary steps related to the main operations are carried out, the method comprising:

providing a main car on which the workpiece is mounted and a main operator rides, and that automatically travels along a predetermined travel route that transits the plurality of stations;

providing a main delivery apparatus that is a type of station that has a main serving position and a main receiving position;

transferring at least one of a part and a jig that is necessary for at least one of the main operations to the main car at the main serving position;

receiving the at least one of the part and the jig from the main car at the main receiving position; and delivering the at least one of the part and the jig that has been received at the main receiving position to the main serving position.

2. The cell manufacturing method according to claim 1, further comprising using a subsidiary car on which a subsidiary operator rides, the subsidiary operator carrying out subsidiary operations in which the at least one of the part and the jig that is necessary for the at least one of the main operations is prepared, the main car and the subsidiary car travel together so as to be able to transfer the at least one of the part and the jig between the main car and the subsidiary car.

3. The cell manufacturing method according to claim 2, further comprising, providing a subsidiary delivery apparatus that is a type of station that has a subsidiary serving position and a subsidiary receiving position;

transferring the at least one of the part and the jig to the subsidiary car;

receiving the at least one of the part and the jig from the subsidiary car at the subsidiary receiving position;

delivering the at least one of the part and the jig that has been received at the subsidiary receiving position to the subsidiary serving position.

4. A cell manufacturing method in which a main operator, who carries out main operations including a plurality of steps in which parts are installed on a workpiece, is moved along with the workpiece so as to transit a plurality of stations at which auxiliary steps related to the main operations are carried out, the method comprising:

providing a main car on which the workpiece is mounted and a main operator rides, and that automatically travels along a predetermined travel route that transits the plurality of stations;

providing a subsidiary car on which a subsidiary operator rides, the subsidiary operator carrying out operations in which at least one of a part and a jig that is necessary for at least one of the main operations is prepared;

using a subsidiary delivery apparatus that is a type of station that has a subsidiary serving position and a subsidiary receiving position;

transferring the at least one of the part and the jig to the subsidiary car at the subsidiary serving position;

receiving the at least one of the part and the jig from the subsidiary car at the subsidiary receiving position; and delivering the at least one of the part and the jig that has been received at the subsidiary receiving position to the subsidiary serving position, wherein the main car and the subsidiary car travel together so as to transfer the at least one of the part and the jig between the main car and the subsidiary car.

5. A cell manufacturing facility in which a main operator, who carries out main operations including a plurality of steps in which parts are installed on a workpiece, is moved along with the workpiece so as to transit a plurality of stations at which auxiliary steps related to the main operations are carried out, the manufacturing facility comprising:
- a main car that is provided with a workpiece holding portion that holds the workpiece and a riding portion that the main operator can ride so as to be able to carry out operations on the workpiece that is held by the workpiece holding portion, and further provided with a travel control apparatus that controls a travel state, and that automatically travels on a travel route that transits the plurality of stations; and
- a main delivery apparatus that is a type of station that has a main serving position at which at least one of a part and a jig that is necessary for at least one of the main operations is transferred to the main car, and a main receiving position at which the at least one of the part and the jig is received from the main car, such that the at least one of the part and the jig that has been received at the main receiving position is delivered to the main serving position.

6. The cell manufacturing facility according to claim 5, wherein:
- the main delivery apparatus comprises a main mounting platform that can move between the main serving position and the main receiving position;
- the main mounting platform is disposed so as to be able to move along an inclined path that inclines such that a height of the path increases as the main receiving position is approached from the main serving position; and
- the main mounting platform is linked to and moves in synchrony with the main car from the main serving position to the main receiving position, and the main mounting platform returns to the main serving position by moving along the inclined path under its own weight, by releasing a link with the main car at the main receiving position, and stands by.

7. The cell manufacturing facility according to claim 5, wherein the main delivery apparatus comprises a main mounting platform that can move between the main serving position and the main receiving position;
- the main mounting platform comprises energy storing means that stores energy accompanying movement of the main mounting platform from the main serving position to the main receiving position and kinetic energy converting means that converts energy that has been stored by the energy storing means into kinetic energy that acts on the main mounting platform from the main receiving position to the main serving position; and
- the main mounting platform is linked to and moves in synchrony with the main car from the main serving position to the main receiving position, energy is stored in the energy storing means, the main mounting platform returns to the main serving position due to the kinetic energy, by releasing a link with the main car at the main receiving position, and stands by.

8. The cell manufacturing facility according to claim 5, wherein:
- the main delivery apparatus comprises a main mounting platform that can move between the main serving position and the main receiving position;
- the main mounting platform is moved from the main receiving position to the main serving position under weight of the at least one of the part and the jig that has been disposed on the main mounting platform, and comprises energy storing means that stores energy and kinetic energy converting means that converts the energy that has been stored by the energy storing means to kinetic energy from the main serving position to the main receiving position; wherein
- the main mounting platform moves from the main receiving position to the main serving position due to the at least one of the part and the jig that has been disposed on the main mounting platform so that the main mounting platform stands by, and the main mounting platform returns to the main receiving position due to the kinetic energy, which is energy stored by the energy storing means that has been converted to kinetic energy by the kinetic energy converting means, due to the at least one of the part and the jig being removed from the main mounting platform at the main serving position, and stands by.

9. The cell manufacturing facility according to claim 5, the main delivery apparatus comprises a main rail that inclines such that a height of the main rail increases as the main receiving position is approached from the main serving position, and the at least one of the part and the jig returns to the main serving position by moving along the main rail under their own weight due to the at least one of the part and the jig being engaged to the main rail at the main receiving position, and stands by.

10. The cell manufacturing facility according to claim 9, wherein,
- the subsidiary delivery apparatus comprises a subsidiary mounting platform that can move between the subsidiary serving position and the subsidiary receiving position;
- the subsidiary mounting platform is disposed so as to be able to move on an inclined path that is inclined such that a height of the inclined path of the subsidiary mounting platform increases as the subsidiary receiving position is approached from the subsidiary serving position; and
- the subsidiary mounting platform is linked to and moves in synchrony with the subsidiary car from the subsidiary serving position to the subsidiary receiving position, and the subsidiary mounting platform returns to the subsidiary serving position by moving along the inclined path under its own weight due to a link with the subsidiary car being released at the subsidiary receiving position, and stands by.

11. The cell manufacturing apparatus according to claim 9, wherein:
- the subsidiary delivery apparatus comprises a subsidiary mounting platform that can move between the subsidiary serving position and the subsidiary receiving position;
- the subsidiary mounting platform comprises energy storing means that stores energy accompanying movement of the subsidiary mounting platform from the subsidiary serving position to the subsidiary receiving position and kinetic energy converting means that converts energy that has been stored by the energy storing means to kinetic energy that acts on the subsidiary mounting platform from the subsidiary receiving position to the subsidiary serving position; and
- the subsidiary mounting platform is linked to and moves in synchrony with the subsidiary car from the subsidiary serving position to the subsidiary receiving position, energy is stored by the energy storing means, and the subsidiary mounting platform returns to the subsidiary serving position due to the kinetic energy that acts on the subsidiary mounting platform, which is the energy stored by the energy storing means that has been converted to kinetic energy by the kinetic energy converting means due to a link with the subsidiary car being released at the subsidiary receiving position, and stands by.

12. The cell manufacturing facility according to claim 9, wherein:
the subsidiary delivery apparatus comprises a subsidiary mounting platform that can move between the subsidiary serving position and the subsidiary receiving position;
the subsidiary mounting platform is moved from the subsidiary receiving position to the subsidiary serving position due to the weight of the at least one of the part and the jig that has been disposed on the subsidiary mounting platform, and comprises energy storing means that stores energy and kinetic energy converting means that converts the energy that has been stored by the energy converting means to kinetic energy from the subsidiary serving position to the subsidiary receiving position; and
the subsidiary mounting platform moves from the subsidiary receiving position to the subsidiary serving position due to the at least one of the part and the jig that has been disposed on the subsidiary mounting platform at the subsidiary receiving position, energy is stored by the energy storing means, the subsidiary mounting platform stands by, and the subsidiary mounting platform returns to the subsidiary receiving position due to the kinetic energy, which is the energy stored by the energy storing means of the subsidiary mounting platform that has been converted to kinetic energy by the kinetic energy converting means of the subsidiary mounting platform due to the at least one of the part and the jig being removed from the subsidiary mounting platform at the subsidiary serving position, and stands by.

13. The cell manufacturing facility according to claim 9, wherein, the subsidiary delivery apparatus comprises a subsidiary rail that inclines such that a height of the subsidiary rail increases as the subsidiary receiving position is approached from the subsidiary serving position, and the at least one of the part and the jig returns to the subsidiary serving position by moving along the subsidiary rail under their own weight due to the at least one of the part and the jig being engaged to the subsidiary rail at the subsidiary receiving position, and stands by.

14. The cell manufacturing facility according to claim 5, further comprising a subsidiary car on which a subsidiary operator rides, the subsidiary operator carrying out subsidiary operations in which the at least one of the part and the jig which is necessary for the at least one of the main operations is prepared; wherein
the main car and the subsidiary car travel together to transfer the at least one of the part and the jig between the main car and the subsidiary car.

15. The cell manufacturing facility according to claim 14, wherein the main delivery apparatus comprises a main rail that inclines such that a height of the main rail increases as the main receiving position is approached from the main serving position, and the at least one of the part and the jig returns to the main serving position by moving along the main rail under their own weight due to the at least one of the part and the jig being engaged to the main rail at the main receiving position, and stands by.

16. The cell manufacturing facility according to claim 14, wherein:
the main delivery apparatus comprises a main mounting platform that can move between the main serving position and the main receiving position;
the main mounting platform is moved from the main receiving position to the main serving position under weight of the at least one of the part and the jig that has been disposed on the main mounting platform, and comprises energy storing means that stores energy and kinetic energy converting means that converts the energy that has been stored by the energy storing means to kinetic energy from the main serving position to the main receiving position; wherein,
the main mounting platform moves from the main receiving position to the main serving position due to the at least one of the part and the jig that has been disposed on the main mounting platform so that the main mounting platform stands by, and the main mounting platform returns to the main receiving position due to the kinetic energy, which is energy stored by the energy storing means that has been converted to kinetic energy by the kinetic energy converting means, due to the at least one of the part and the jig being removed from the main mounting platform at the main serving position, and stands by.

17. The cell manufacturing facility according to claim 14, wherein the main delivery apparatus comprises a main mounting platform that can move between the main serving position and the main receiving position;
the main mounting platform comprises energy storing means that stores energy accompanying movement of the main mounting platform from the main serving position to the main receiving position and kinetic energy converting means that converts energy that has been stored by the energy storing means into kinetic energy that acts on the main mounting platform from the main receiving position to the main serving position; and
the main mounting platform is linked to and moves in synchrony with the main car from the main serving position to the main receiving position, energy is stored in the energy storing means, the main mounting platform returns to the main serving position due to the kinetic energy, by releasing a link with the main car at the main receiving position, and stands by.

18. The cell manufacturing facility according to claim 14, wherein:
the main delivery apparatus comprises a main mounting platform that can move between the main serving position and the main receiving position;
the main mounting platform is disposed so as to be able to move along an inclined path that inclines such that a height of the path increases as the main receiving position is approached from the main serving position; and
the main mounting platform is linked to and moves in synchrony with the main car from the main serving position to the main receiving position, and the main mounting platform returns to the main serving position by moving along the inclined path under its own weight, by releasing a link with the main car at the main receiving position, and stands by.

19. The cell manufacturing facility according to claim 14, further comprising a subsidiary delivery apparatus that is a type of station that has a subsidiary serving position at which the at least one of the part and the jig, which is also necessary for at least one of the subsidiary operations, is transferred to the subsidiary car, and a subsidiary receiving position at which the at least one of the part and the jig is received from the subsidiary car, such that the at least one of the part and the jig that has been disposed at the subsidiary receiving position is delivered to the subsidiary serving position.

20. The cell manufacturing facility according to claim 19, wherein:
the main delivery apparatus comprises a main mounting platform that can move between the main serving position and the main receiving position;
the main mounting platform is disposed so as to be able to move along an inclined path that inclines such that a height of the path increases as the main receiving position is approached from the main serving position; and
the main mounting platform is linked to and moves in synchrony with the main car from the main serving position to the main receiving position, and the main mounting platform returns to the main serving position by moving along the inclined path under its own weight, by releasing a link with the main car at the main receiving position, and stands by.

21. The cell manufacturing facility according to claim 19, wherein the main delivery apparatus comprises a main mounting platform that can move between the main serving position and the main receiving position;
the main mounting platform comprises energy storing means that stores energy accompanying movement of the main mounting platform from the main serving position to the main receiving position and kinetic energy converting means that converts energy that has been stored by the energy storing means into kinetic energy that acts on the main mounting platform from the main receiving position to the main serving position; and
the main mounting platform is linked to and moves in synchrony with the main car from the main serving position to the main receiving position, energy is stored in the energy storing means, the main mounting platform returns to the main serving position due to the kinetic energy, by releasing a link with the main car at the main receiving position, and stands by.

22. The cell manufacturing facility according to claim 19, wherein:
the main delivery apparatus comprises a main mounting platform that can move between the main serving position and the main receiving position;
the main mounting platform is moved from the main receiving position to the main serving position under weight of the at least one of the part and the jig that has been disposed on the main mounting platform, and comprises energy storing means that stores energy and kinetic energy converting means that converts the energy that has been stored by the energy storing means to kinetic energy from the main serving position to the main receiving position; wherein,
the main mounting platform moves from the main receiving position to the main serving position due to the at least one of the part and the jig that has been disposed on the main mounting platform so that the main mounting platform stands by, and the main mounting platform returns to the main receiving position due to the kinetic energy, which is energy stored by the energy storing means that has been converted to kinetic energy by the kinetic energy converting means, due to the at least one of the part and the jig being removed from the main mounting platform at the main serving position, and stands by.

23. The cell manufacturing facility according to claim 19, wherein the main delivery apparatus comprises a main rail that inclines such that a height of the main rail increases as the main receiving position is approached from the main serving position, and the at least one of the part and the jig returns to the main serving position by moving along the main rail under their own weight due to the at least one of the part and the jig being engaged to the main rail at the main receiving position, and stands by.

24. The cell manufacturing facility according to claim 19, wherein:
the subsidiary delivery apparatus comprises a subsidiary mounting platform that can move between the subsidiary serving position and the subsidiary receiving position;
the subsidiary mounting platform is disposed so as to be able to move on an inclined path that is inclined such that a height of the inclined path of the subsidiary mounting platform increases as the subsidiary receiving position is approached from the subsidiary serving position; and
the subsidiary mounting platform is linked to and moves in synchrony with the subsidiary car from the subsidiary serving position to the subsidiary receiving position, and the subsidiary mounting platform returns to the subsidiary serving position by moving along the inclined path under its own weight due to a link with the subsidiary car being released at the subsidiary receiving position, and stands by.

25. The cell manufacturing apparatus according to claim 19, wherein:
the subsidiary delivery apparatus comprises a subsidiary mounting platform that can move between the subsidiary serving position and the subsidiary receiving position;
the subsidiary mounting platform comprises energy storing means that stores energy accompanying movement of the subsidiary mounting platform from the subsidiary serving position to the subsidiary receiving position and kinetic energy converting means that converts energy that has been stored by the energy storing means to kinetic energy that acts on the subsidiary mounting platform from the subsidiary receiving position to the subsidiary serving position; and
the subsidiary mounting platform is linked to and moves in synchrony with the subsidiary car from the subsidiary serving position to the subsidiary receiving position, energy is stored by the energy storing means, and the subsidiary mounting platform returns to the subsidiary serving position due to the kinetic energy that acts on the subsidiary mounting platform, which is the energy stored by the energy storing means that has been converted to kinetic energy by the kinetic energy converting means due to a link with the subsidiary car being released at the subsidiary receiving position, and stands by.

26. The cell manufacturing facility according to claim 19, wherein:
the subsidiary delivery apparatus comprises a subsidiary mounting platform that can move between the subsidiary serving position and the subsidiary receiving position;
the subsidiary mounting platform is moved from the subsidiary receiving position to the subsidiary serving position due to the weight of the at least one of the part and the jig that has been disposed on the subsidiary mounting platform, and comprises energy storing means that stores energy and kinetic energy converting means that converts the energy that has been stored by the energy converting means to kinetic energy from the subsidiary serving position to the subsidiary receiving position; and
the subsidiary mounting platform moves from the subsidiary receiving position to the subsidiary serving position due to the at least one of the part and the jig that has been disposed on the subsidiary mounting platform at the subsidiary receiving position, energy is stored by the energy storing means, the subsidiary mounting platform stands by, and the subsidiary mounting platform returns to the subsidiary receiving position due to the kinetic energy, which is the energy stored by the energy storing means of the subsidiary mounting platform that has been converted to kinetic energy by the kinetic energy converting means of the subsidiary mounting platform due to the at least one of the part and the jig being removed from the subsidiary mounting platform at the subsidiary serving position, and stands by.

27. The cell manufacturing facility according to claim 19, wherein the subsidiary delivery apparatus comprises a subsidiary rail that inclines such that a height of the subsidiary rail increases as the subsidiary receiving position is approached from the subsidiary serving position, and the at least one of the part and the jig returns to the subsidiary serving position by moving along the subsidiary rail under its own weight due to the at least one of the part and the jig being engaged to the subsidiary rail at the subsidiary receiving position, and stands by.

28. A cell manufacturing facility in which a main operator, who carries out main operations including a plurality of steps in which parts are installed on a workpiece, is moved along with the workpiece so as to transit a plurality of stations at which auxiliary steps related to the main operations are carried out, the facility comprising:

a main car that is provided with a workpiece holding portion that holds the workpiece and a riding portion that the main operator can ride so as to be able to carry out operations on the workpiece that is held by the workpiece holding portion, and further provided with a travel control apparatus that controls a travel state, and that automatically travels on a predetermined travel route that transits the plurality of stations;

a subsidiary car on which a subsidiary operator rides, the subsidiary operator carrying out subsidiary operations in which the at least one of the part and the jig that is necessary for the main operations is prepared; and a subsidiary delivery apparatus that is a type of station that has a subsidiary serving position at which the at least one of the part and the jig that is necessary for at least one of the subsidiary operations is transferred to the subsidiary car, and a subsidiary receiving position at which the at least one of the part and the jig is received from the subsidiary car, such that the at least one of the part and the jig that has been disposed at the subsidiary receiving position is delivered to the subsidiary serving position, wherein the main car and the subsidiary travel together to transfer the at least one of the part and the jig between the main car and the subsidiary car.

* * * * *